United States Patent [19]

Tashima

[11] Patent Number: 5,495,558
[45] Date of Patent: Feb. 27, 1996

[54] DEVELOPMENT SUPPORTING SYSTEM AND METHOD FOR FUZZY INFERENCE DEVICES

[75] Inventor: Toshihiro Tashima, Joyo, Japan

[73] Assignee: Omron Corporation, Kyoto, Japan

[21] Appl. No.: 886,007

[22] Filed: May 20, 1992

[30] Foreign Application Priority Data

May 20, 1991 [JP] Japan .................................... 3-142648

[51] Int. Cl.⁶ ............................... G06F 15/00; G06F 9/44
[52] U.S. Cl. .................................. 395/51; 395/50; 395/61; 395/76; 395/900
[58] Field of Search ..................................... 395/3, 10–11, 395/21, 51, 61, 900, 50, 76

[56] References Cited

U.S. PATENT DOCUMENTS

| | | | |
|---|---|---|---|
| 4,918,620 | 4/1990 | Ulug | 395/51 |
| 5,058,033 | 10/1991 | Bonissone et al. | 395/51 |
| 5,165,011 | 11/1992 | Hisano | 395/51 |
| 5,168,549 | 12/1992 | Takagi et al. | 395/21 |
| 5,175,795 | 12/1992 | Tsuda et al. | 395/3 |
| 5,191,638 | 3/1993 | Wakami et al. | 395/11 |
| 5,239,620 | 8/1993 | Yamakawa et al. | 395/61 |
| 5,243,687 | 9/1993 | Ando et al. | 395/3 |
| 5,251,285 | 10/1993 | Inoue et al. | 395/10 |
| 5,303,331 | 4/1994 | Namba | 395/51 |
| 5,377,309 | 12/1994 | Sonobe et al. | 395/76 |

FOREIGN PATENT DOCUMENTS

| | | |
|---|---|---|
| 373628 | 6/1990 | European Pat. Off. . |
| 420166 | 4/1991 | European Pat. Off. . |
| 424890 | 5/1991 | European Pat. Off. . |

OTHER PUBLICATIONS

Batur et al, "self organizing model based expert controller"; IEEE International conference on Systems Engineering, pp. 411–414, 24–26 Aug. 1989.

Mantaras et al, "A Fuzzy logic approach ot the management of linguistically expressed uncertainty"; Proceedings of the eighteenth International Symposium on multiple-valued logic, pp. 144–151, 24–26 May 1988.

Wang et al, "A knowledge based system for qualitative ECG simulation and ECG analysis"; Proceedings. Computers in Cardiology, pp. 733–736, 23–26 Sep. 1991.

IEE 1990, "MCFS: A Multiple Criteria Reasoning Fuzzy Expert Systems Building Tool," A. Kamel, et al., pp. 605–610.

AICommunications, (1988) Jan., No. 1, Amsterdam, NL, "Managing Linguistically Expressed Uncertainty In MILORD Application to Medical Diagnosis".

Primary Examiner—Robert W. Downs
Assistant Examiner—Tariq Hafiz
Attorney, Agent, or Firm—Dickstein, Shapiro & Morin

[57] ABSTRACT

The invention involves a fuzzy inference development system which prepares, automatically, an inference engine module file and a knowledge (i.e., rules and membership functions) data file which are optimized for the system (the CPU or equivalent) which the user intends to use and for the knowledge established by the user. The user inputs the required specifications and knowledge data via a user interface. The characteristic parameters (number of rules, number of types of input and output variables, etc.) are extracted from the knowledge data. A number of inference engine modules are stored, prior to the use of the device, in an inference engine library. The inference engine module, which is both optimal for the required specifications which have been input and for the parameters which have been extracted, is selected from the modules in the library by means of a fuzzy inference performed in an inference engine selection unit. When the selected module has been compiled by compilers, it is outputted to the user.

48 Claims, 30 Drawing Sheets

FIG. 3

| REQUIRED SPECIFICATIONS | | RELATIVE IMPORTANCE |
|---|---|---|
| OPERATION TIME | : MAX 2ms | 3 |
| PROGRAM CAPACITY | : MAX 2K BYTES | 3 |
| WORK AREA | : MAX 128 BYTES | 5 |
| PROCESSING SEQUENCE | : EXECUTE PROCESSING WHEN ALL DATA HAVE BEEN ASSEMBLED | 1 |
| DEGREE OF FREEDOM IN SELECTING MF SHAPE | : BASIC FORM IS TRAPEZOID | 4 |
| CPU USED | : CPUA | |
| OPERATING FREQUENCY | : 8MHz | |

ANTECEDENT MEMBERSHIP FUNCTION
FOR WA AND JY

ANTECEDENT MEMBERSHIP FUNCTION
FOR SP, RO, MF, RN, IN, ON AND ZN

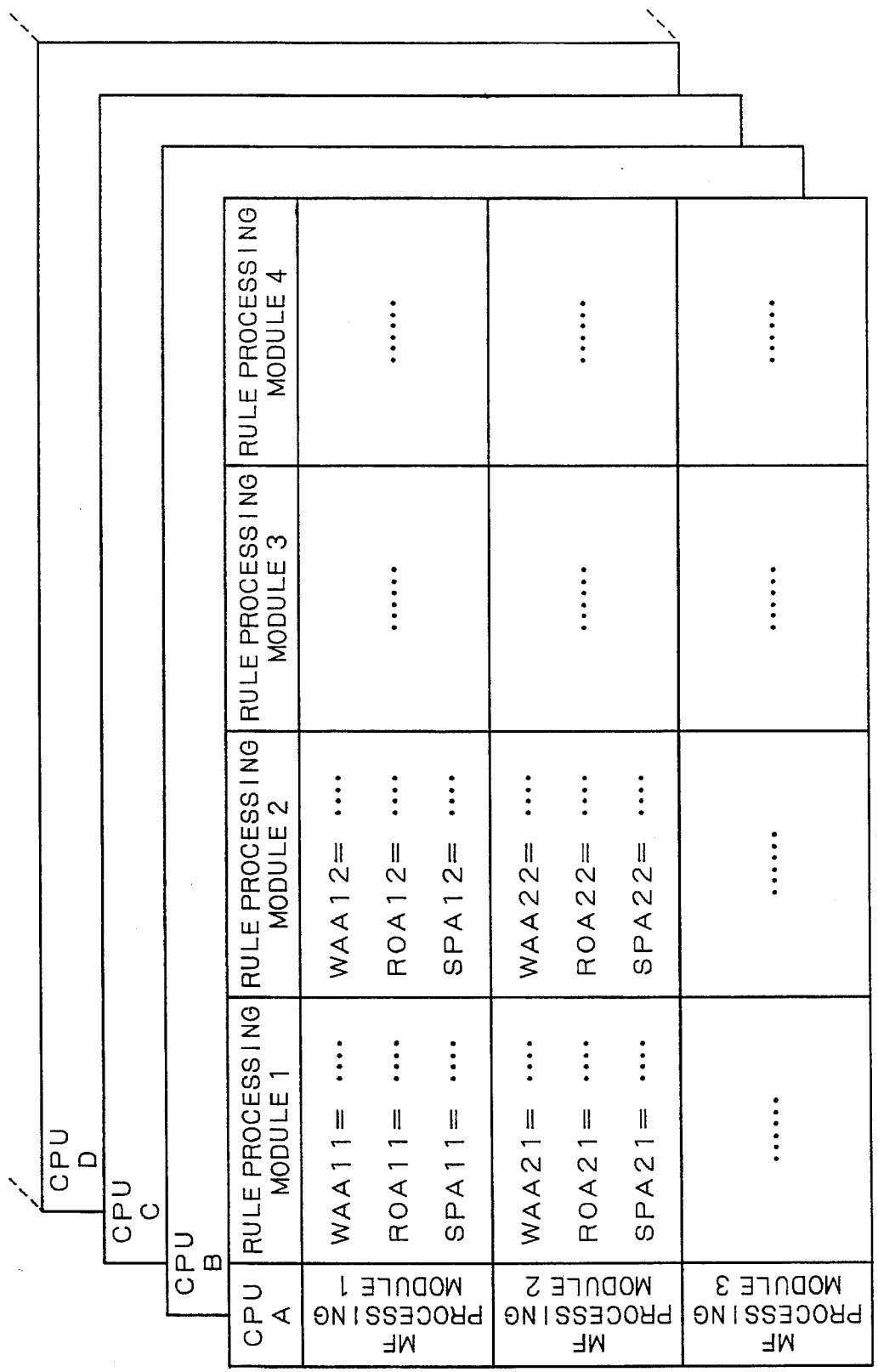

FIG. 7

RULE 1 : If x1=PL and x2=PM and x4=PS. then y1=PM
RULE 2 : If x1=PL and x4=ZR. then y1=ZR
RULE 3 : If x2=PM and x3=PS. then y1=PS
RULE 4 : If x2=PM and x3=PS and x4=NS. then y1=NS
RULE 5 : If x3=NS and x4=ZR. then y1=ZR
RULE 6 : If x1=PL and x2=PM and x3=PM. then y1=PM
RULE 7 : If x2=PL and x3=PS and x4=ZR. then y1=ZR
RULE 8 : If x1=PL. then y1=PL
RULE 9 : If x1=PL and x2=PM and x3=PM. then y2=NL
RULE 10: If x2=PM and x3=PS and x4=ZR. then y2=ZR
......

FIG. 8

| | | |
|---|---|---|
| ANT | x1=PL | RULE1 |
| ANT | x2=PM | |
| ANT | x4=PS | |
| CON | y1=PM | |
| ANT | x1=PL | RULE2 |
| ANT | x4=ZR | |
| CON | y1=ZR | |
| ┊ | ┊ | ┊ |
| DEF | PROCESSING TO CALCULATE DEFINED VALUES | |
| END | COMPLETION PROCESSING | |

FIG. 9A
INPUT DATA AREA
FIG. 9B
OUTPUT DATA AREA
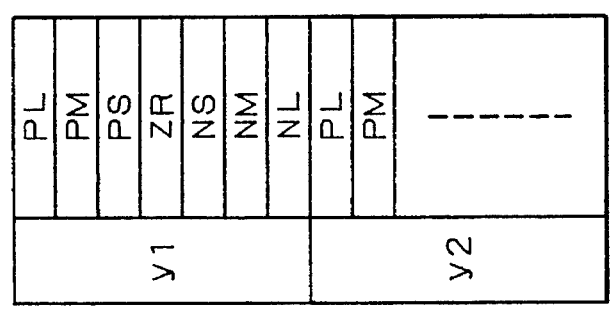
FIG. 9C
CONSEQUENT DATA AREA
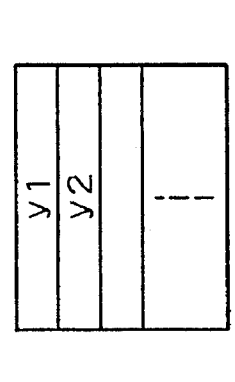
FIG. 9D
GOODNESS OF FIT AREA

FIG. 11

```
(RULE 8)       : If x1=PL                              . then y1=PL
(RULES 6 AND 9): If x1=PL and x2=PM and x3=PM. then y1=PM or y2=NL
(RULE 1)       : If x1=PL and x2=PM and x4=PS. then y1=PM
(RULE 2)       : If x1=PL and x4=ZR           . then y1=ZR
(RULE 3)       : If x2=PM and x3=PS           . then y1=PS
(RULE 4)       : If x2=PM and x3=PS and x4=NS . then y1=NS
(RULES 7 AND 10): If x2=PM and x3=PS and x4=ZR. then y1=ZR or y2=ZR
(RULE 5)       : If x3=NS and x4=ZR           . then y1=ZR
```

FIG. 13

| If | x1=PL |
|---|---|
| THEN | y1=PL |
| AND1 | x2=PM |
| AND2 | x3=PM |
| THEN | y1=PM |
| THEN | y2=NL |
| AND2 | x4=PS |
| THEN | y1=PM |
| AND1 | x4=ZR |
| THEN | y1=ZR |
| If | x2=PM |
| ⋮ | ⋮ |
| DEF | PROCESSING OF PEFINING CALCULATIONS |
| END | COMPLETION PROCESSING |

FIG. 16

| | | |
|---|---|---|
| ANT | ad1 | |
| ANT | ad9 | RULE1 |
| ANT | ad24 | |
| CON | y1=PM | |
| ANT | ad1 | |
| ANT | ad25 | RULE2 |
| CON | y1=ZR | |
| ⋮ | ⋮ | ⋮ |
| DEF | DEFINING CALCULATIONS ARE PROCESSED | |
| END | COMPLETION PROCESSING | |

FIG. 17

| ADDRESS | GOODNESS OF FIT AREA | |
|---|---|---|
| ad1 | PL | |
| ad2 | PM | |
| ad3 | PS | |
| ad4 | ZR | x1 |
| ad5 | NS | |
| ad6 | NM | |
| ad7 | NL | |
| ad8 | PL | |
| ad9 | PM | |
| ad10 | PS | |
| ad11 | ZR | x2 |
| | | |
| ⋮ | ⋮ | |
| ad22 | PL | |
| ad23 | PM | |
| ad24 | PS | |
| ad25 | ZR | x4 |
| ad26 | NS | |
| ad27 | NM | |
| ad28 | NL | |
| ⋮ | ⋮ | |

FIG. 19

(RULE 1)  If x1=PL & x2=PM & x3=S  & x4=PS. then y1=PM
(RULE 2)  If x1=PL & x2=S  & x3=S  & x4=ZR. then y1=ZR
(RULE 3)  If x1=S  & x2=PM & x3=PS & x4=S . then y1=PS
(RULE 4)  If x1=S  & x2=PM & x3=PS & x4=NS. then y1=NS
(RULE 5)  If x1=S  & x2=S  & x3=NS & x4=ZR. then y1=ZR
(RULE 6)  If x1=PL & x2=PM & x3=PM & x4=S . then y1=PM
(RULE 7)  If x1=S  & x2=PM & x3=PS & x4=ZR. then y1=ZR
(RULE 8)  If x1=PL & x2=S  & x3=S  & x4=S . then y1=PL
(RULE 9)  If x1=PL & x2=PM & x3=PM & x4=S . then y1=NL
(RULE10)  If x1=S  & x2=PM & x3=PS & x4=ZR. then y1=ZR
....

FIG. 23

ADDRESS

| Address | |
|---|---|
| 000 – 0FF | MF-0 (INPUT x1-PL) |
| 100 – 1FF | MF-1 (INPUT x1-PM) |
| 200 – 2FF | MF-2 (INPUT x1-PS) |
| 300 – ⋮ | ⋮ |
| N00 – NFF | MF-N (INPUT xE-NL) |

FIG. 29

MF DATA (INPUT VARIABLE x1)

| | |
|---|---|
| x11 | (APEX OF MF 11) |
| x12 | (APEX OF MF 12) |
| x13 | (APEX OF MF 13) |
| x14 | (APEX OF MF 14) |
| x15 | (APEX OF MF 15) |
| x16 | (APEX OF MF 16) |
| x17 | (APEX OF MF 17) |
| g11 | (SLOPE OF SPACE T11) |
| g12 | (SLOPE OF SPACE T12) |
| g13 | (SLOPE OF SPACE T13) |
| g14 | (SLOPE OF SPACE T14) |
| g15 | (SLOPE OF SPACE T15) |
| g16 | (SLOPE OF SPACE T16) |

DEVELOPMENT SUPPORTING SYSTEM AND METHOD FOR FUZZY INFERENCE DEVICES

FIELD OF THE INVENTION

This invention concerns a development supporting apparatus and method for fuzzy inference devices which is to be used as a tool for the development of a fuzzy inference processing program or a fuzzy inference processing system.

BACKGROUND OF THE INVENTION

There are currently available on the market development tools for fuzzy inference devices. These tools are used to develop source programs to execute fuzzy inference processing. They are used in digital fuzzy processors, which are development tools, and in microprocessors and other types of general-use computers.

In the development tools described above, there is only one possible inference engine. The user thus has no choice but to correct and recorrect the knowledge (the rules and membership functions) until it conforms to the limitations of the inference engine, i.e., number of rules, number of types of input variables, number of types of output variables, etc.

Furthermore, development tools which output a source program use a generalized description of the knowledge, which makes them highly redundant. The source program operates on a large scale even when there is only a small amount of knowledge (rules and membership functions). A large memory capacity is thus required to store such a program, and the processing speed is low.

SUMMARY OF THE INVENTION

In view of the foregoing, it should be apparent that there exists a need in the art for an apparatus and method which develops an efficient and optimal fuzzy inference processing program. It is therefore a primary object of the invention to provide a development supporting system for fuzzy inference devices which can assemble an inference engine and knowledge file which are specifically suited to the system (the CPU or equivalent) which the user intends to use and to the knowledge which the user establishes.

It is another object of the present invention to perform operations for a fuzzy inference according to specified rules, using as characteristic parameters the required specifications and the knowledge which have been input. It will then select the appropriate inference engine module according to the results of the inference operations.

It is another object of the invention that the aforementioned data concerning the required specifications will concern at least one of the following: the capacity of the work area in the memory which can be used for fuzzy inference operations; the memory capacity which can be used for storage of inference engine modules; the computing speed required by the inference engine modules; the sequence of processing to be used for the anticipated input data in a fuzzy inference, and the number of degrees of freedom associated with the shape of the membership function established in the antecedent of the rule.

It is another object of the present invention that the aforementioned data concerning the required specifications include data concerning what type of CPU is expected to be used and what its operating clock frequency will be.

It is a further object of the invention that the aforementioned data concerning the required specifications include data concerning the importance and priority ranking of the capacity of the aforementioned work area, the memory capacity, the computing speed, the sequence of processing and the number of degrees of freedom.

It is another object of the invention to provide a further embodiment where each of the inference engine modules consists of a rule processing module which stipulates how the rules which have been established are to be processed, and a membership function processing module. This processing module includes a scheme to describe the membership functions which have been established as well as a scheme to calculate the goodness of fit of the input data with respect to the membership functions.

It is a further object of the invention to provide rule processing modules, which stipulate how the specified rules are to be processed, and the membership function processing modules, which include a scheme to describe the membership functions which have been established as well as a scheme to calculate the goodness of fit of the input data with respect to the membership functions. Each inference engine module manifests as the combination of a rule processing module and a membership function module.

It is another object of this invention to provide a further embodiment where the simulation of a fuzzy inference is executed in accordance with the knowledge input via a knowledge data input device. If necessary, the simulation is repeated as the knowledge is revised. These simulations are used to verify the knowledge.

It is another object of this invention to provide a database containing the properties of the inference engines, with a scheme to calculate a property for each aspect of the inference engine which is specified. The property data is stored for each inference engine in the aforementioned inference engine library. The invention is also equipped with a means to calculate properties of inference engines. This device applies to the appropriate operational scheme, which is stored in the aforesaid data base for properties of inference engines, the characteristic parameters of the inference engine for the inference engine module selected by the selection device described above and the characteristic parameters of the knowledge input by the knowledge input device described above.

It is another object of this invention wherein the aforementioned specified aspects of the inference engine for which a property will be calculated will include at least one of the following: the work area in the memory which is needed to execute fuzzy inferences; the memory capacity needed to store the fuzzy inference engine; and the computing speed for fuzzy inferences.

It is yet another object of this invention to display those properties calculated by the aforesaid property calculation device on a display device.

It is yet another object of this invention whereby several inference engine modules are selected by the aforesaid selection device; the properties of the selected inference engine modules are calculated by the aforesaid calculation device and the properties calculated for each of the inference engine modules are displayed on the aforesaid display device.

It is a further object of this invention wherein one of the several inference engine modules whose properties are displayed on the aforesaid display device is selected by the user.

It is yet another object of this invention to provide a capability for the user to reenter specifications data or knowledge data after a user has rejected the inference engine module whose properties are displayed on the aforesaid display device.

It is yet another object of this invention to store a variety of inference engine modules in an inference engine library prior to use of the system. Data are input concerning the specifications the user requires the inference engine to have, and data are input which are associated with the knowledge needed for the fuzzy inferences the user intends to execute. The inference engine module, which is deemed to be best suited for the sorts of fuzzy inferences the user has in mind according to the knowledge which he has input and which best meets his specifications, is automatically selected from among the various inference engine modules stored in the aforesaid inference engine library.

It is another object of this invention whereby the inference engine module which has been selected is processed so as to render it more suitable for the knowledge which has been input, and the knowledge which has been input is processed so as to render it more suitable for the inference engine module which has been selected, and the results of the processing are output.

It is another object of the present invention to provide a development supporting system for fuzzy inference devices which is equipped with a means to perform processing and output the results. This device processes the inference engine module selected by a selection device so as to render it more suitable for the knowledge input via a second input device. It also processes the knowledge input via the second input device so as to render it more suitable for the inference engine module selected by the aforesaid selection device.

Briefly described, these and other objects of the invention are accomplished in their apparatus aspects by providing a fuzzy inference development system which has a specifications data input device for receiving specifications for the inference engine which are required by the user; an input device receives data associated with knowledge to be used for the fuzzy inferences which the user intends to make; an inference engine library is also included. The library stores a number of types of inference engine modules. The system also includes a means to select, from the various inference engine modules stored in the aforementioned inference engine library, that inference engine module which would be appropriate for the fuzzy inferences which might be made using the knowledge input via the knowledge input device described above, and which would conform to the specifications input via the specifications input device.

The method of the present invention is carried out by the steps of storing a variety of inference engine modules in an inference engine library prior to use of the system. The user then inputs data concerning the specifications he requires the inference engine to have. The user also inputs data associated with the knowledge needed for the fuzzy inferences he intends to execute. The inference engine module, which is deemed to be best suited for the sorts of fuzzy inferences the user has in mind according to the knowledge and specifications data, is then automatically selected from among various inference engine modules stored in the inference engine library.

As has been discussed above, this invention makes it possible to construct a fuzzy inference system (including the inference engine module and knowledge file which have been output) which meets or approximates the specifications (including its properties) which the user requires. Thus, with this invention, the functions of the fuzzy inference system can easily be upgraded by adding more data to the inference engine library, to the data base of inference engine properties and to the data base of knowledge data needed to process fuzzy inferences, in order to select an appropriate inference engine.

This invention is suitable to be used not only for the development of fuzzy inference systems for general-use computers such as microprocessors, but also for the development of dedicated fuzzy processors.

BRIEF DESCRIPTION OF THE DRAWING

FIG. 3 shows an example of a screen display when the required specifications are input;

FIG. 6 shows the contents of the data base for inference engine properties;

FIG. 7 shows examples of rules;

FIG. 8 shows the rule memory in a rule processing module R1;

FIGS. 9 (A), (B), (C) a (D) show the various sub-areas provided within the work area;

FIG. 11 shows rules which have been rearranged by rule processing module R2;

FIG. 13 shows the rule memory;

FIG. 16 shows the rule memory in a rule processing module R3;

FIG. 17 shows the goodness of fit area;

FIG. 19 shows examples of rules in a rule processing module R4;

FIG. 23 shows the MF memory in a processing module M1;

FIG. 29 shows the contents of the MF memory; and

DETAILED DESCRIPTION OF THE INVENTION

The embodiments of this invention will be explained in the order of the following table of contents.

Table of Contents (1) The Overall Configuration of the Development Supporting System for Fuzzy Inference Devices.

(2) The Flow of Operations Used in the Development Supporting System for Fuzzy Inference Devices.

(3) How the Selection of an Inference Engine is Processed.

(4) How the Properties of the Inference Engine are Calculated.

(5) Details of Rule Processing Modules.

(5-1) Rule Processing Module 1.

(5-2) Rule Processing Module 2.

(5-3) Rule Processing Module 3.

(5-4) Rule Processing Module 4.

(6) Details of Membership Function (MF) Processing Modules.

(6-1) MF Processing Module 1.

(6-2) MF Processing Module 2.

(6-3) MF Processing Module 3.

(1) The Overall Configuration of the Development Supporting System for Fuzzy Inference Devices.

This development supporting system for fuzzy inference devices has the following general features which will be elaborated in more detail below. The user inputs the specifications of the fuzzy inference processing system he would like to realize. These specifications include properties of the inference engine, the relative importance of each aspect and the type of CPU to be used, as will be discussed below. The user also inputs knowledge, which includes rules and membership functions. The development supporting system selects the inference engine (or program module) which meets or best approximates the specifications which have been input and which is best suited to the knowledge identified by the user. The inference engine selected is optimized for the knowledge which has been input, that knowledge is changed to the form which is best suited for processing by the inference engine, and both results are output. As a result of this invention, a fuzzy inference system can thereby be automatically realized which meets the specifications the user desires and which contains the knowledge data that the user has established.

Figure 1:
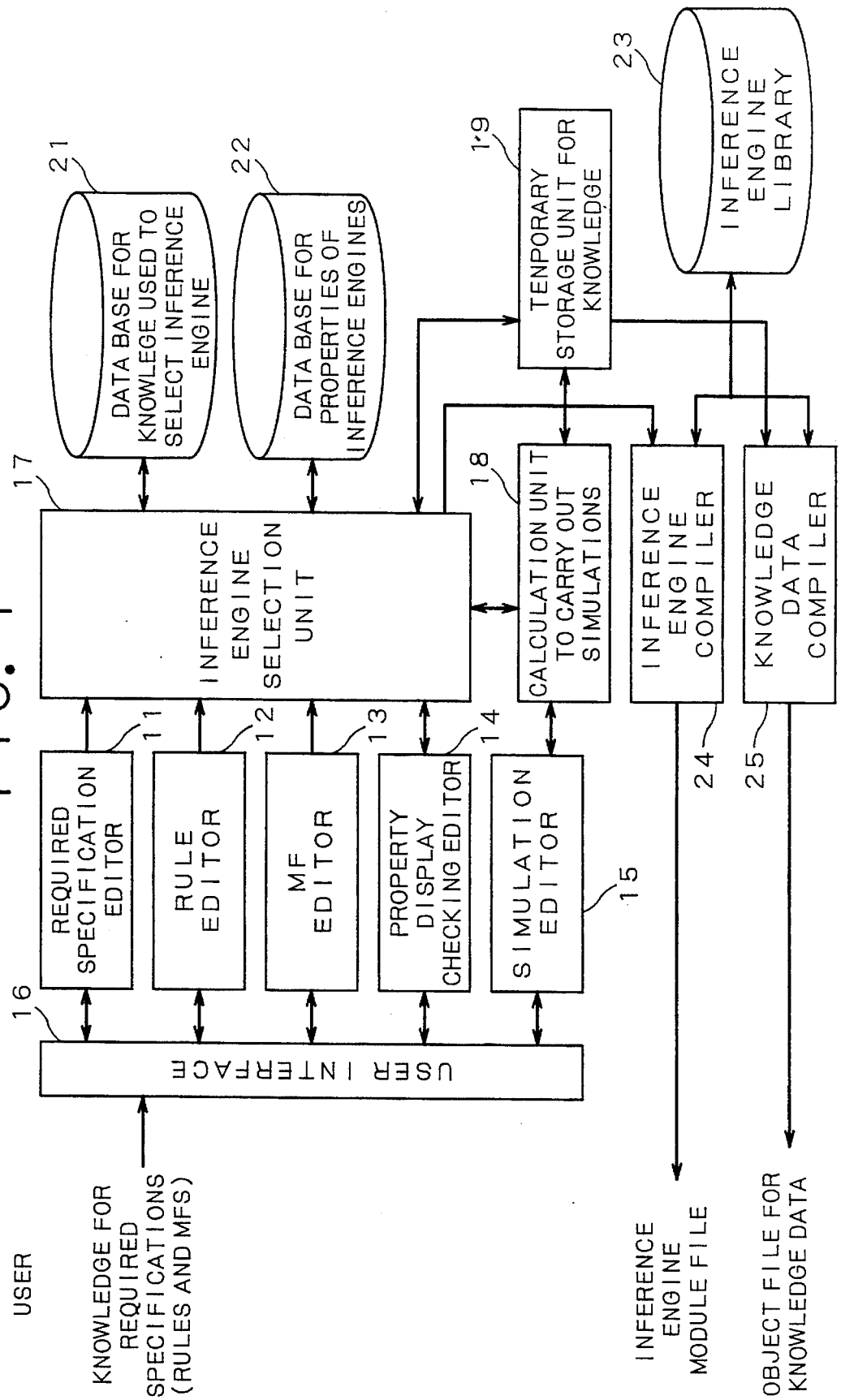
FIG. 1 is a block diagram illustrating the overall configuration of the development supporting system for fuzzy inference devices.

Referring now in detail to the drawings wherein like parts are designed by like reference numerals, the overall configuration of the development supporting system for fuzzy inference devices is illustrated in FIG. 1.

Specifically, the development supporting system has a user interface, 16, which includes input devices such as a keyboard, a mouse, and so on; and a display device such as a CRT. An editor 11 is employed for the required specifications. A rule editor 12, an MF (membership function) editor 13, a property display/checking editor 14 and a simulation editor 15 are connected to user interface 16.

The specification editor 11, rule editor 12 and MF editor 13 use the above-noted input devices to enter data concerning the specifications which the user requires and the knowledge (rules and membership functions), in order to create a display suitable for input purposes (a menu, for example), and display it on the display device. Devices 11–13 take the data which have been input and store them temporarily. An example of a screen displayed when the required specifications are input is shown in FIG. 3.

The property display/checking editor 14 displays the properties which have been calculated for the inference engine selected, as will be discussed below. It also displays a screen suitable for the user to input whether or not he is satisfied with those properties.

The simulation editor 15 displays a screen suitable for entering data and commands necessary to perform the simulation, and it displays the results of the simulation.

The specification editor 11, rule editor 12, MF editor 13 and property display/checking editor 14 are in turn connected to a selection unit 17, which selects the inference engine. The simulation editor 15 is connected to a calculation unit 18, which performs the simulation.

The selection unit 17 is connected to the operation unit 18, which performs the simulation, the storage unit 19, which stores the knowledge temporarily, the data base 21, which contains knowledge data used to select an inference engine, the data base 22, which contains the properties of the inference engines, the inference engine library 23, the inference engine compiler 24, and knowledge data compiler 25.

The inference engine library 23 is a storage device which stores the various inference engine modules which have been established ahead of time. The inference engine modules are composed of rule processing modules (or programs) (hereafter called simply "rule processing"), in which rule processing schemes are described; and membership function processing modules (or programs) (hereafter called simply "MF processing"). The latter contain information that describe the membership functions (or storage schemes) and information to calculate a goodness of fit.

In the first embodiment, there are four types of rule processing and three types of MF processing. Thus, the first embodiment has twelve different inference engine modules to choose from.

Figure 4:
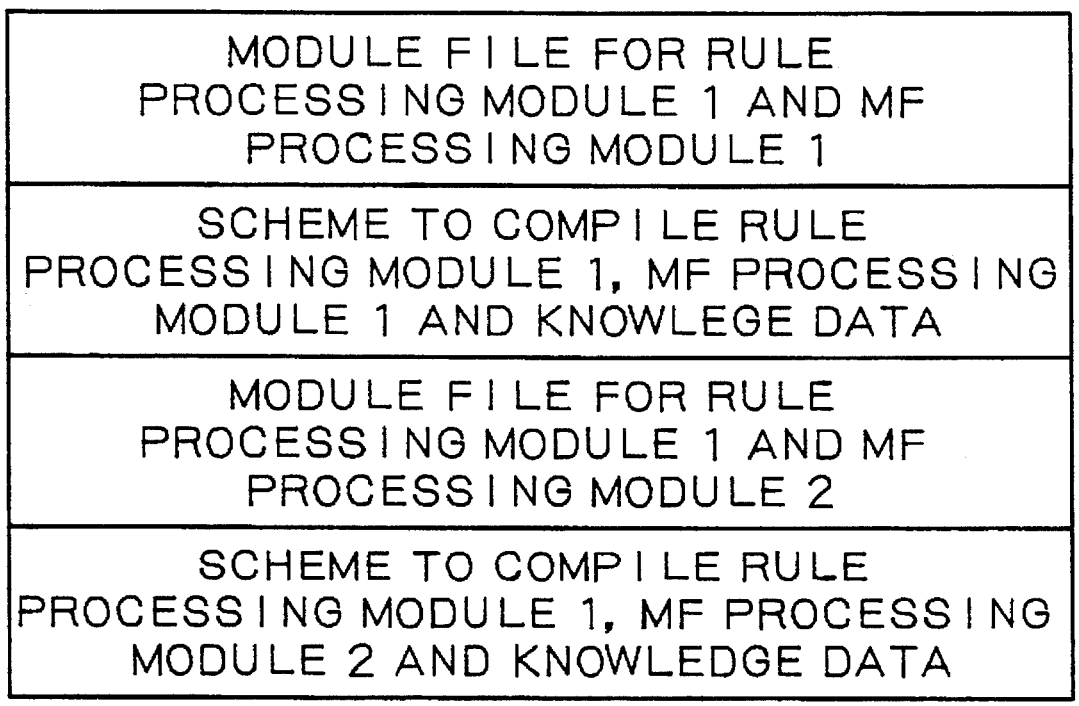
FIG. 4 shows the contents of the inference engine library.

As shown in FIG. 4, for each inference engine module in library 23, the rule processing and MF processing are stored prior to the use of the system. The information comprises the module and the scheme used to process (i.e., compile) the data (in concrete terms, the program to perform the processing) when the results of the processing and the knowledge data which are to be output are stored prior to the use of the system.

Figure 5A:
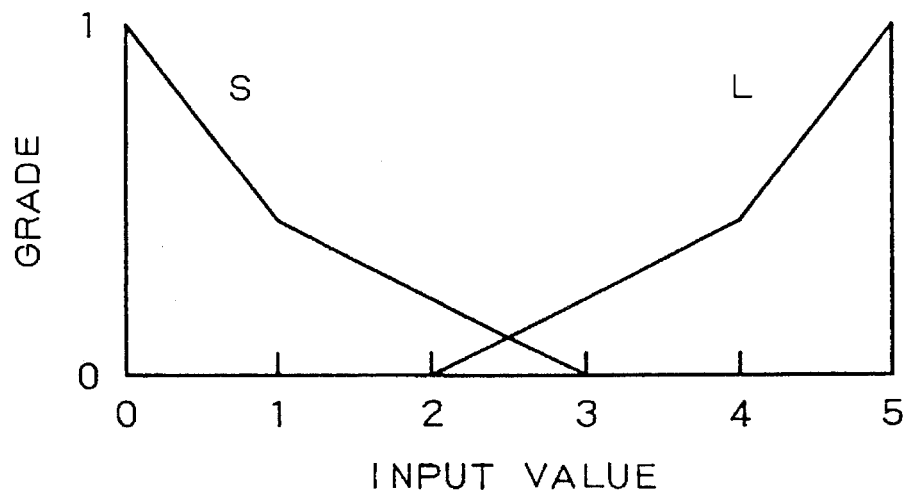
FIGS. 5 (A) and (B) are graphs which show examples of membership functions used in the processing performed to select an inference engine.
Figure 5B:
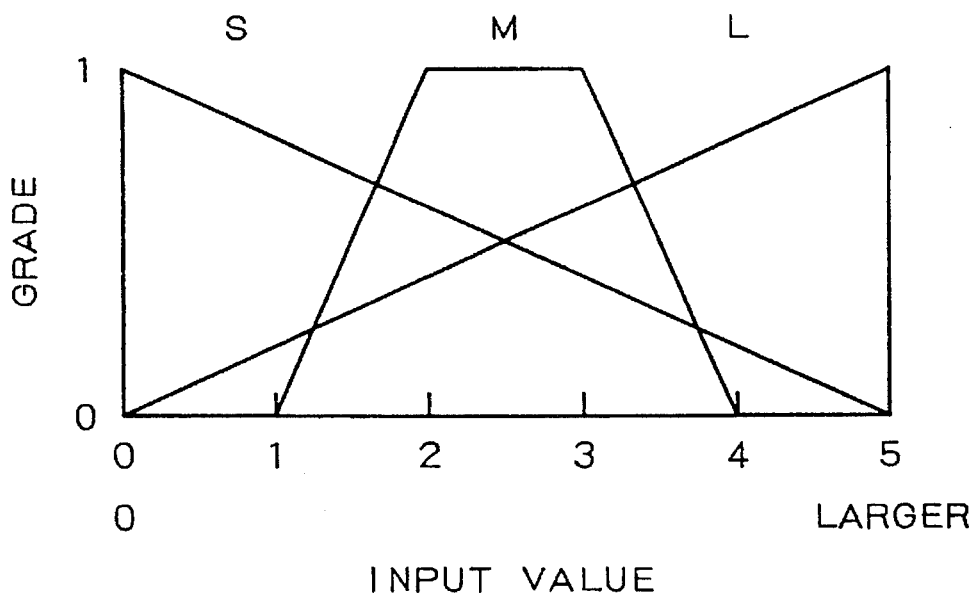

In operation, selection unit 17 performs the processing necessary to select, from the inference engines stored in library 23, the optimal inference engine for the user based on the required specifications and knowledge input by that user. The processing used to select the inference engine entails fuzzy inference operations, as will be explained below. The knowledge (i.e., rules and membership functions) used in selecting an inference engine, which is needed for this fuzzy inference, is stored in data base 21. Examples of membership functions stored in data base 21 are shown in FIGS. 5 (A) and (B).

The selection unit 17 also calculates the properties of the inference engine which is selected. It does so according to the calculation formula stored in data base 22, the data base for properties of inference engines. An example of data base 22 is shown in FIG. 6. A number of different CPUs can be used to realize the fuzzy inference system. The different CPUs will be labeled A, B, C, D, and so on. Stored in each type of CPU are the various operation formulas for each of the inference engines (which are combinations of rule processing operations and MF processing modules). Selection unit 17 is also responsible for the control of simulations, the transmission of the various data, and the overall control of the development supporting system. Details regarding the operations of unit 17 are provided below.

The operation unit 18 performs simulations of fuzzy inferences according to the knowledge input by the user. A single type of inference engine may be designated to perform these simulations. The storage unit 19 is used for temporary storage of the knowledge data established by the user and input via user interface 16.

The inference engine compiler 24 processes the inference engine module which was ultimately selected by the selection unit 17 to optimize it with respect to the knowledge established by the user. The knowledge data compiler 25 processes the knowledge data established by the user and stored temporarily in storage unit 19 to optimize that data with respect to the processing used by the inference engine module which was ultimately selected. After undergoing processing by compilers 24 and 25, the inference engine module and knowledge data are finally output in the form of an inference engine module file and a knowledge data object file.

(2) The Flow of Operations Used in the Development Supporting System for Fuzzy Inference Devices.

Figure 2:
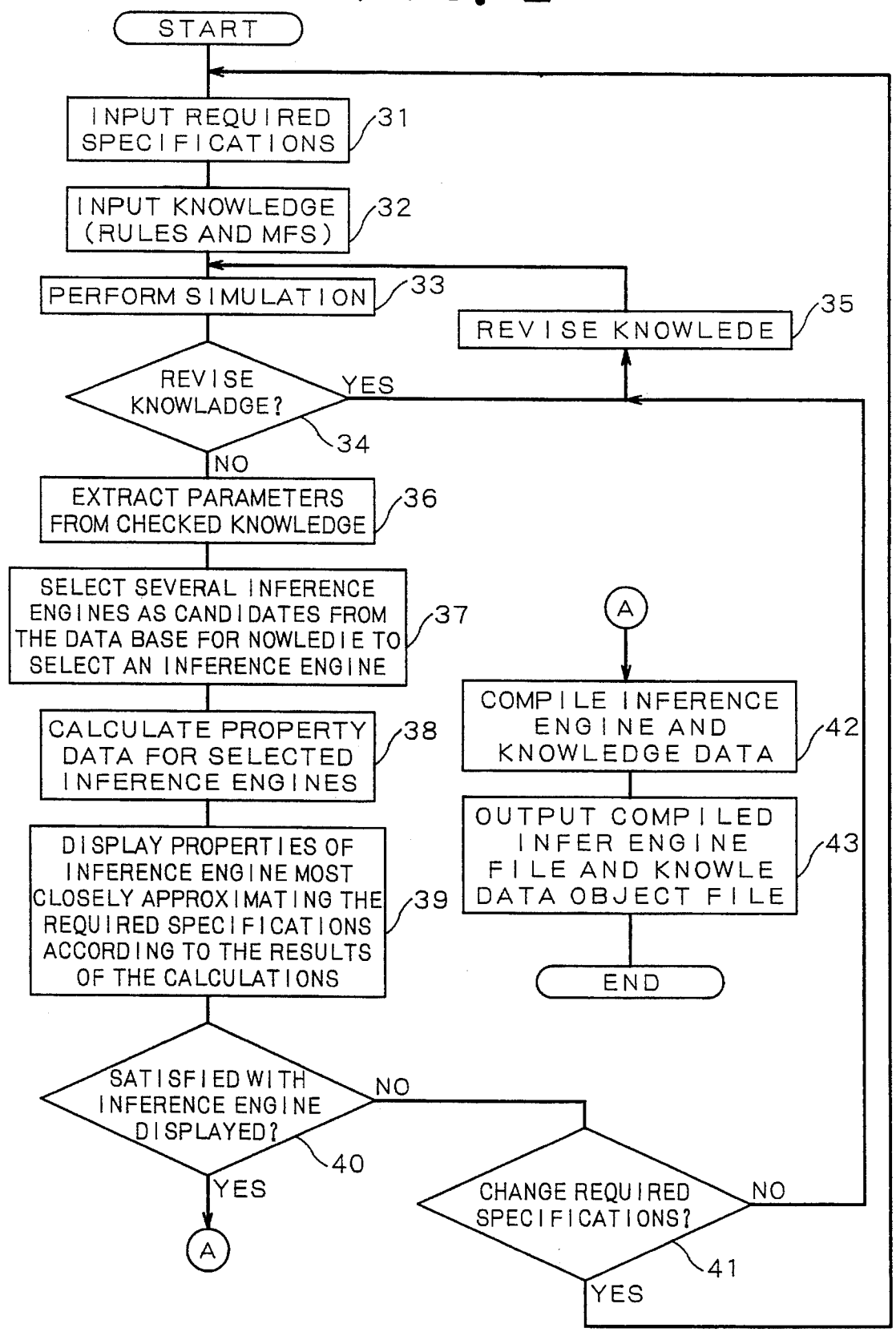
FIG. 2 is a flowchart of the overall operations performed in the development supporting system for fuzzy inference devices.

FIG. 2 is a flowchart of the overall operations performed in the development supporting system for fuzzy inference devices.

After operations are initiated, data concerning the specifications which the user requires are input at Step 31 by that user via user interface 16 under the control of specification editor 11.

As shown in FIG. 3, there are five required specifications to be designated: (1) The operation time (sometimes called calculating speed or processing speed) which is the time (in ms) needed to complete one cycle of fuzzy inference operations (i.e., the time from the moment the fuzzy inference operations begin until the moment they are completed); (2) the program capacity, (expressed in bytes), which is the capacity of the memory (in general, a ROM) needed to store the inference engine modules and knowledge data; (3) the capacity of the work area (in general a RAM is used and which is expressed in bytes), which is the capacity needed for fuzzy inference processing; (4) the sequence of processing which indicates whether the fuzzy processing should be performed after the input data associated with all of the input variables described in the rules have been gathered or whether the inference operations on the input data should be begun as soon as a single input datum has been entered, despite the fact that the input data have not been gathered (the inference operations are performed in the same order in which the data were input, and performed for each input datum); and (5) the number of degrees of freedom associated with the shape of the membership function in the antecedent of each rule which refers to such questions as whether the shape of the function may be set at the user's discretion, so that it may even include curves or whether the basic form of the function should be a trapezoid or whether the function may be expressed as a triangle.

In this first embodiment, the membership function in the consequent is expressed as a singleton, so the number of degrees of freedom specifications element (5) is not input for the shape of this consequent membership function. It is, of course, possible to input a number of degrees of freedom for the membership function in the consequent if necessary.

Among the specifications data, the operation time, the program capacity (the capacity of the ROM) and the capacity of the work area (i.e., of the RAM) are essential properties of the inference engine modules that are identified.

The relative importance of each of the aforementioned five specifications is also input as specifications data. Relative importance is expressed as one of six numerals between 0 and 5. The higher the importance of the specifications element, the higher the numeral assigned. This value is used in the fuzzy inference operations performed to select an inference engine module, as will be discussed below. The relative importance of a specifications element may also be considered to represent its priority ranking.

In addition to the aforesaid specifications items, the type of CPU which the user intends to use and its operating clock frequency are also input.

Returning to FIG. 2, the knowledge data (i.e., the rules and membership functions) are input at Step 32 for the fuzzy inference system which the user wishes to realize. The user inputs these data under the control of the rule editor 12 and MF editor 13 by way of the user interface 16. How these knowledge data are input depends on the inference engine in operation unit 18, the unit which performs simulations. There, the data which the user has input, can be changed to the optimal form for this inference engine. The MF data may also be input in a way that conforms to the number of degrees of freedom for membership functions which was stipulated in the specifications. For example, using the specifications data of FIG. 3, the user selected a trapezoid as the fundamental shape of the membership functions. He is then able to enter the data necessary to express this fundamental shape.

When all the knowledge data have been input, they are stored temporarily in storage unit 19. Thus, when a command to start a simulation is received from the user interface 16 at Step 33, the operation unit 18 performs a simulation of fuzzy inference operations based on the knowledge data in storage unit 19. The simulation may be performed either with input data received either in random order or in fixed order. The results of the simulation are displayed on the display device under the control of simulation editor 15. This display may, for example, be expressed in the form of a graph or similar visual representation which shows input and output characteristics.

By viewing the results of the simulation, the user can decide whether the knowledge data which he has input up to that point gives rise to a sufficiently acceptable result, or whether the result is still insufficient. He then decides at Step 34 whether or not to revise the knowledge.

If the user wishes to revise the knowledge, he performs the task via the user interface 16. The revised (or unrevised) knowledge data are then stored temporarily in storage unit 19 for that purpose at Step 35. Another simulation is then repeated at Step 33. The knowledge data can be revised, and simulations performed as many times as necessary.

If it is the user's judgment, after viewing the simulation results, that the knowledge is acceptable as established, he then inputs his acceptance via user interface 16. At this point, the parameters are then extracted from the knowledge data which has now been checked at Step 36.

The characteristic parameters of the knowledge data include the number of rules PN; the number of types of input variables IN; the number of types of output variables ON; the number of antecedent propositions (or subroutines) contained in all of the rules ZN; the number of consequent propositions contained in all of the rules KN; the number of types of membership functions ZM used in antecedents; and the number of types of membership functions KM used in consequents.

As discussed above, the knowledge (rules and membership functions) needed for the fuzzy inference operations which is used to select the optimal inference engine module from the twelve modules stored in inference engine library 23, is stored in data base 21. This knowledge is described in reference to the five required specifications (FIG. 3) noted previously and the four parameters extracted from the aforesaid input knowledge. Details regarding this knowledge will be discussed below.

The selection unit 17 then performs fuzzy inference operations according to the knowledge which was established for inference engine selection in the data base 21. For these operations, it uses the relative importance which has been input for the various specifications and the parameters extracted from the inputted knowledge. In light of the results of these operations, at Step 37, unit 17 chooses several candidates from the twelve inference engines in library 23 and several candidates from the twelve inference engines in library 33. (In this example, unit 17 chooses two types of rule processing and two types of MF processing engines, the combination of which yields four inference engine modules).

At Step 38, the calculation unit 17 then calculates, according to the calculation formula stored in data base 22, the properties of the four inference engine modules which were selected as candidates. Among these properties are the program capacity (i.e., the capacity of the ROM), the capacity of the work area (i.e., that of the RAM) and the operation time.

Of the four inference engine modules, the one with properties that most nearly approximate the required specifications is displayed on the display device along with its properties, under the control of editor 14, Step 39.

The user then views the display and decides whether the properties of the inference engine module displayed are satisfactory. He then inputs his finding via user interface 16 at Step 40, and it is transmitted by way of the editor 14 to the selection unit 17.

In the event that the properties of the inference engine module displayed are not sufficient, the user can either modify the required specifications or revise the knowledge requirements at Step 41. If the user decides to modify the specifications, processing returns to Step 31 and the process restarts from the beginning. If he decides to revise the knowledge data, processing returns to Step 35 and resumes at the point where the knowledge is revised.

It is also possible to display the properties of all four inference engine modules calculated in Step 38. If this option is chosen, the user must first decide which of the four sets of properties displayed is most suitable, or he may choose to modify the required specifications or revise the knowledge.

If the user is satisfied with the properties of one of the inference engine modules (if the answer in Step 40 is YES), that module is read out of library 23 and sent to inference engine compiler 24 and knowledge data compiler 25. At the same time, the knowledge data stored in storage unit 19 are sent to compilers 24 and 25.

Inference engine compiler 24 performs the processing or compilation to optimize the inference engine module read out of library 23 for the knowledge read out of storage unit 19. (This processing may include establishing parameters for the number of types of input variables, the number of rules, the number of cycles for program loops and the like.) At Step 42, the knowledge data compiler 25 performs the processing or compilation to revise the knowledge data read out of storage unit 19 so that they are better fitted for the processing performed by the inference engine module. (This compilation may include changing the listing of the rule data, creating and arranging membership function data, and so on.)

The inference engine module and knowledge data which are compiled are then output at Step 43 in the form of an inference engine module file and an object file for knowledge data.

(3) Processing Performed to Select an Inference Engine.

As discussed above, each inference engine module (or program) is composed of rule processing modules (modular programs) and MF processing modules (also modular programs). In this example, it has been established that there are four types of rule processing modules which shall be called rule processing modules R1, R2, R3 and R4. Three types of MF processing have also been postulated, which we shall call MF processing modules M1, M2 and M3.

The rule and MF processing modules will be explained in detail below, so at this point we shall give only a cursory explanation of their features.

Rule processing module 1 (R1) stores the rule data in the rule memory in the order in which they were input. It performs inference operations in the order in which the rule data were stored in the rule memory. It has the feature that it can use a work area of one byte to store goodness of fit information. In other words, it can get by with a small-capacity work area (i.e., a small-capacity RAM).

Rule processing module 2 (R2) extracts subrules (antecedent propositions) which are common to rule descriptions. It substitutes the subrules in sequences which have a large number of described cycles and stores them in the rule memory. It performs inference operations in the order in which the subrules are stored. It has the feature of a fast operational speed (i.e., short operation time). When there are a large number of types of input variables or antecedent propositions (i.e., a large number of subrules), it is conceivable that many of the subrules also overlap. Rule processing module 2 would be useful in this type of case, too.

Rule processing module 3 (R3) calculates the goodness of fit of the received data with respect to each of the antecedent membership functions which have been established, and it stores this goodness of fit in the memory. It looks up the appropriate goodness of fit in the memory for every rule it processes. Its salient feature is that it does all the goodness of fit calculations ahead of time so as to increase the processing speed.

Rule processing module 4 (R4) performs the rule processing associated with the input data. It does so for each input datum in the order in which the input data were received. In contrast to rule processing modules 1 to 3, which begin their inference calculations once all the input data have been assembled, rule processing module 4 has the feature that it performs its processing sequentially, in the order in which the input data are received. When there are a large number of types of input variables, it will take a correspondingly long time for all the input data to be gathered. Because it obviates the need to wait until the input of data is completed, rule processing module 4 is useful in cases in which there are a large number of input variables.

MF processing module 1 (M1) stores in the memory the membership function value for each membership function. It reads out of that memory, as the goodness of fit, the value corresponding to the input data which it has received. Although a large-capacity ROM is used for the membership function memory, M1 has the advantage of a fast operation speed and a high number of degrees of freedom with respect to the shape of the membership function.

MF processing module 2 (M2) stores in the membership function memory, the data which express the membership function whose basic form is a trapezoid. These data consist of the coordinates of the points where the angles are and the slope of the ascent and descent. These data are stored for each membership function and used to determine the goodness of fit of the received input data. M2 provides an intermediate number of degrees of freedom with respect to the shape of the membership function and an intermediate operation speed, but allows the use of a small-capacity ROM.

MF processing module 3 (M3) establishes a number of triangular membership functions for a single input variable such that every two adjacent membership functions overlap, and the areas that overlap are symmetrical. M3 also stores in the membership function memory the coordinates of the apex of each membership function and the slope of one of its sides. It then uses these data to determine the goodness of fit of the received input data. M3 provides only a small number of degrees of freedom regarding the shape of the membership function, but it can function with an extremely small ROM (for its membership function memory), so it is useful when there are a large number of antecedent propositions.

The features of the processing modules R1 through R4 and M1 through M3 which are described above are used to create rules to select these processing modules. Examples of such rules follow:

If SP=S & WA=L & JY=S & RN=L & IN=S & ON=S, then RU=R1.

If SP=L & JY=S & IN=L & ZN=L, then RU=R2.

If SP=L & WA=S & JY=S & RN=L & IN=S & ZN=S, then RU=R3.

If RO=S & JY=L & IN=L & ZN=L, then RU=R4.

If RO=S & SP=L & MF=L & IN=S & ZN=S, then MF=M1.

If RO=L & SP=M & MF=M & IN=L & ZN=M, then MF=M2.

If RO=L & MF=S & IN=L & ZN=L, then MF=M3.

Wherein, SP, WA, RO, JY and MF are antecedent variables related to various required specifications and RN, IN, ON and ZN are antecedent variables related to parameters extracted from the knowledge. Their meanings are given below:

SP: Importance of Operation Time (Calculating Speed).

WA: Importance of RAM (Work Area) Capacity.

RO: Importance of ROM (Rule Data or Membership Function Memory) Capacity.

JY: Importance of Processing Sequence.

MF: Importance of Number of Degrees of Freedom of Membership Function Shape.

RN: Number of Rules.

IN: Number of Types of Input Variables.

ON: Number of Types of Output Variables.

ZN: Number of Antecedent Propositions (Number of Combinations of Input Variables and Membership Functions).

S, L and M are used to express the labels of the membership functions (i.e., the language data which characterize the membership functions). The labels S and L for the antecedent variables WA and JY are shown in FIG. 5 (A). The labels S, M and L for the antecedent variables SP, RO, MF, RN, IN, ON and ZN are shown in FIG. 5 (B). S stands for "small," L for "large" and M for "medium."

An example the first rule is as follows: This rule states that if SP=S (the calculating speed is low) and WA=L (a large-capacity RAM can be used); JY=S (processing begins when all input data have been gathered); RN=L (module is useful when there is a large number of rules); IN=S (module is useful when there is a small number of input variables; and ON=S (module is useful when there is a small number of output variables); then RU=R1 (R1 should be used as the rule processing module).

The RU and MF in the consequents are consequent variables which stand for "rule processing module" and "membership function processing module" respectively. The membership function of the consequents are expressed as singletons.

In Step 37 of FIG. 2, a fuzzy inference is performed according to the rule described above, with the relative importance of the various required specifications which were input and the parameter values extracted from the knowledge as input data. The two consequent propositions with the highest goodness of fit are then selected for a rule processing module and an MF processing module. When the two types of rule processing modules are combined with the two types of MF processing modules, a total of four types of inference engine modules are selected.

(4) How the Properties of the Inference Engine are Calculated.

As has been discussed above, in Step 38 of FIG. 2, the properties are calculated for each of the four types of inference engine modules selected as described in the preceding paragraphs. As an example, we shall discuss the calculation of the properties of the inference engine module constructed by combining rule processing module 1 (R1) with MF processing module 2 (M2).

Suppose that unit CPUA has been input in the required specifications as the CPU to be used. The formula used to calculate WAA11, the capacity of the RAM established for rule processing module 1 and MF processing module 1 with respect to CPUA, (hereafter known as Formula 1), the formula used to calculate ROA11, the capacity of the ROM, (Formula 2), and the formula used to calculate SPA11, the operation speed, (Formula 3), are then read out of the data base for properties of inference engines shown in FIG. 6.

WAA11, the capacity of the RAM (in bytes), is the required capacity of the work area, and is obtained by the following formula:

$$WAA11 = IN + KM + ON + 1 \ldots \qquad \text{Formula 1}$$

Where IN is the number of types of input variables (See FIG. 9 (A)); KM is the total number of combinations of output variables and membership functions in the consequent (See FIG. 9 (C); and ON is the number of types of output variables (See FIG. 9 (B)). The final "1" in Formula 1 indicates that one byte is needed for the goodness of fit area (See FIG. 9 (D)).

The capacity of the ROM (in bytes), ROA11, refers to the memory capacity needed to store the programs (the inference engine modules) and the knowledge data (rules and membership functions). It is obtained by the following formula:

$$ROA11 = XSA1 + XMA1 + XR1 + ZM \sim 256 \ldots \qquad \text{Formula 2}$$

Where XSA1 is the capacity of the module file of rule processing module 1 when the program is run on CPUA; XR1 is the capacity of the memory needed to store the rule data, i.e., that of the rule memory (see FIG. 8, and ZM is the number of types of antecedent membership functions (the number from MF-O to MF-N in FIG. 23). The 256 at the end of Formula 2 refers to the fact that 256 bytes are needed to store one antecedent membership function. The membership function values and the input data (corresponding to addresses) are both expressed as eight bits (1 byte=8 bits).

The operation speed SPA11 (expressed in ms) is the time needed for one cycle of fuzzy inference processing, as described above. It is obtained by the following formula:

$$SPA11=(ZN\text{-}XCA1+KN\text{-}XCA2+SN\text{-}XCA3+ON\text{-}XCA4)/DCLK\ldots$$

Formula 3

Where ZN is the number of antecedent propositions (subrules) in all the rules; XCA1 is the number of steps needed to process the antecedent propositions when the program is run on CPUA (the number of steps needed for the processing between Steps 52 and 54 in FIG. 10); KN is the number of consequent propositions in all the rules; XCA2 is the number of steps needed to process the consequent propositions when the program is run on CPUA (Steps 55 and 56 in FIG. 10); SN is the number of subrules in the antecedents and consequents (See FIG. 8); XCA3 is the number of steps needed to read out the subrules from CPUA (Step 51 in FIG. 10); ON is the number of output variables; XCA4 is the number of steps needed to perform the checking operations when the program is run on CPUA (Steps 57 and 58 in FIG. 10); and DCLK is the operating clock frequency. The time needed to perform Steps 59 and 60 in FIG. 10 has been omitted from Formula 3, but it can be added as needed. Also note in Formula 3 for the steps between XCA1 and XCA4, there is one step per clock cycle).

Because the types of commands used (MIN and MAX operations, ADD, SUBTRACT, MULTIPLY and DIVIDE operations, etc.) may differ depending on the type of CPU employed, the aforementioned XSA1, XMA1 and XCA1 through XCA4 may have different values depending on the type of CPU.

Figure 10:
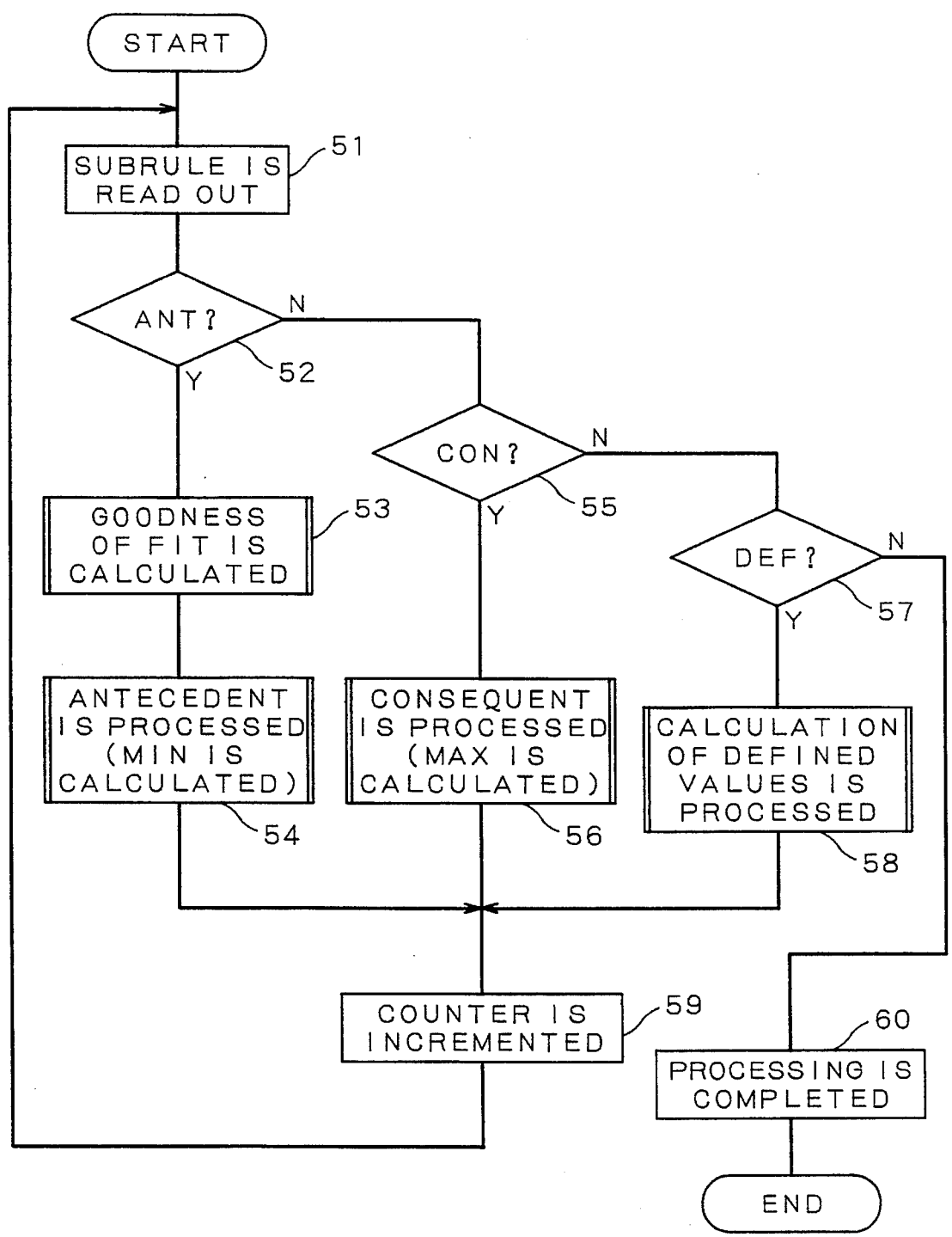
FIG. 10 is a flow chart showing the fuzzy inference operations performed in rule processing module R1.

As shall be explained in detail below, rule processing module 1 is illustrated in FIGS. 8 through 10, and MF processing module 1 in FIGS. 23 and 24. The explanation given above is made with reference to those figures.

As can be seen in FIG. 6, the formulas used to calculate the capacity of the RAM WAAij, the capacity of the ROM ROAij and the operation speed SPAij for each of the inference engine modules with respect to every type of CPU are stored in the data base for properties of inference engines. In Step 38, then, the properties are calculated, according to the type of CPU to be used, for the inference engine module selected.

(5) Details of Rule Processing Modules.

As has been discussed above, an inference engine module consists of a rule processing module and an MF processing module. In the following section, we shall discuss four types of rule processing modules.

To make the explanation more concrete it is assumed that certain rules have been established which are like those shown in FIG. 7 (if-then rules). x1, x2, x3 and x4 are input variables. There may be more than four types of input variables. y1 and y2 are output variables. There may be more than two types of output variables: PL through NL are labels for membership functions. There are seven possible labels. PL stands for positive large; PM for positive medium; PS for positive small; ZR for virtually zero; NS for negative small; NM for negative medium; and NL for negative large.

Antecedent membership functions have seven classifications for every input variable. Even if different input variables have the same label, the shape and position of their membership functions may vary. For example, the PL membership function associated with input x1 (which we express as input x1-PL) differs in a general way from the PL membership function associated with input x2 (input x2-PL).

We further postulate that the aforesaid seven classifications have been established for each output variable in the consequent membership functions. For the sake of simplicity, singletons are used as the consequent membership functions.

(5-1) Rule Processing Module R1.

Details of rule processing module 1 are shown in FIGS. 8 through 10.

The antecedent and consequent of each rule shown in FIG. 7 are broken into their input and output variables. The resulting segments are called subrules. Rule 1, for example, can be broken into the four following subrules:

IF x1=PL
AND x2=PL
AND x4=PS
THEN y1=PM

Subrules preceded by IF or AND are antecedents, which are designated by having the code ANT added to them. Subrules preceded by THEN are consequents, which are designated by the code CON.

The data expressing these subrules are stored in the rule memory, as shown in FIG. 8, together with the codes mentioned above according to the sequence of the rules. This sequence, i.e., the numbers attached to the rules, is left to the discretion of the user. At the end of the subrules, the code DEF is put in to indicate the DEFINE operation, and data are arranged which are associated with that operation (data expressing types of output variables which must be processed in a DEFINE operation or the scheme used for the operation). At the very end of these rule data are arranged the completion code END and the data for completion processing.

FIG. 9 shows the work area, which is divided into work areas for input data, output data, consequent data and goodness of fit.

The input data area (FIG. 9 (A)) is where the input data associated with each input variable are stored. It has storage space (every one byte) for the number of types of input variables (IN in Formula 1). The output data area (FIG. 9 (B)) is where the results of the fuzzy inferences performed for each of the output variables are stored as output data. It has storage space for the number of types of output variables (ON in Formula 1).

The consequent data area (FIG. 9 (C)) is where the goodness of fit is stored which operates on the membership functions with respect to every output variable. It has storage space for the number of types of consequent membership variables (number of types of output variables~7 labels), KN in Formula 1. The goodness of fit area (FIG. 9 (D)) is where the goodness of fit calculated by the goodness of fit operation, or resulting from a MIN operation, are temporarily stored. It is composed of one byte of storage space.

Referring now to FIG. 10, a flowchart illustrates the processing by the inference operation in the rule processing sequence.

At Step 51 the subrules are first read out of the rule memory one by one. A judgment is then made as to whether the code accompanying the subrule is either an ANT, CON or DEF at Steps 52, 55 and 57, respectively. If the read code is ANT, the subrule is an antecedent, and the input data associated with the input variable in that subrule are read out of the input data area. At Step 53, the goodness of fit is then calculated for those input data with respect to the membership function for that same subrule. The processing involved in calculating the goodness of fit is performed by the MF processing module, explained in detail in a later section.

A MIN operation is then performed on the goodness of fit and the value stored in the goodness of fit area (the initial value is the maximum value for the goodness of fit, which is 1). The result of the MIN operation is stored in the goodness of fit area, Step 54. The MIN operation is performed on all the antecedent subrules contained in a single rule.

The address counter, which keeps track of the addresses in the rule memory, is then incremented, at Step 59 and processing returns to Step 51 and the next subrule is read out.

If the code for the subrule which is read out is CON, that subrule is a consequent, and the processing of that rule is in its final stage. A MAX operation is performed at Step 56 on the goodness of fit (the result of the MIN operation) in the goodness of fit area and the value (initially 0) stored in the consequent data area associated with the consequent membership function for that subrule. The result of the MAX operation is stored in the storage space reserved for consequent membership functions within the consequent data area.

The MAX operation is performed to obtain one unique goodness of fit with respect to common consequent membership functions when different rules, such as Rule 1 and Rule 6, have the same consequent (y1=PM).

The address counter is then incremented at Step 59 and processing returns to Step 51.

If the code which is read out is DEF, DEFINE operation processing is performed for each output variable using the goodness of fit data stored in the consequent data area, Step 58. If the consequent membership function is a singleton, the goodness of fit in the consequent data area will represent, without any further processing, the height of the corresponding singleton. Processing for the DEFINE operation may use a maximum height method to obtain the center of balance of the consequent membership functions (singletons) to which this goodness of fit has been applied. This method selects the membership function with the highest apex.

The results of the DEFINE operation processing are stored in the output data area in the form of output data for each output variable. The address counter is then incremented and the completion code is read out. (Steps 59 and 51) If output data is only read out, then the END processing is performed and one cycle of fuzzy inference operations is completed at Step 60.

(5-2) Rule Processing Module R2.

Details of the processing performed by rule processing module R2 are shown in FIGS. 11 through 15.

The rule processing module R2 analyzes and reorganizes groups of rules. For example, the group of rules shown in FIG. 7 is reassembled in the form shown in FIG. 11.

The processing involved in this analysis and reorganization is performed in the following sequence:

S1. The most frequently expressed propositions (subrules) are found by searching the antecedents of all the rules. In the group of rules shown in FIG. 7, the proposition expressed most frequently is x1=PL.

S2. Next, the rules which contain the proposition x1=PL, which were extracted in S1 above, are assembled into a group. The proposition x1=PL can be found in rules 1, 2, 6, 8 and 9, so these rules are grouped together.

S3. The rules in this group are checked to find whether any of them have only the single proposition x1=PL which was extracted in S1 above. If there are any such rules, they are extracted. Rule 8 has only the single proposition x1=PL.

S4. The aforesaid group is checked again to find which antecedent proposition appears most frequently in the rules other than rule 8, which was removed from consideration in S3 above. In the remaining rules, rules 1, 2, 6 and 9, the proposition expressed with the greatest frequency is x2=PM. A subgroup is formed consisting of the rules which have the proposition x2=PM in their antecedent. In this case, (i.e. rules 1, 6 and 9), belong to this subgroup.

S5. By repeatedly performing the processing used in S3 and S4 to create these subgroups, the rules within the subgroups can be rearranged so that they are in order according to the frequency with which a proposition appears in their antecedent, and according to how few propositions the antecedent contains.

S6. When the rules in the group which contains the proposition x1=PL have been rearranged, the process defined in Steps S1 through S5 above is repeated on the remaining rules.

S7. When all the rules have been rearranged, they are broken into subrules, and the subrules are ordered optimally for successive processing of fuzzy inference operations, a code (or command) is attached to each of the subrules.

Figure 12:
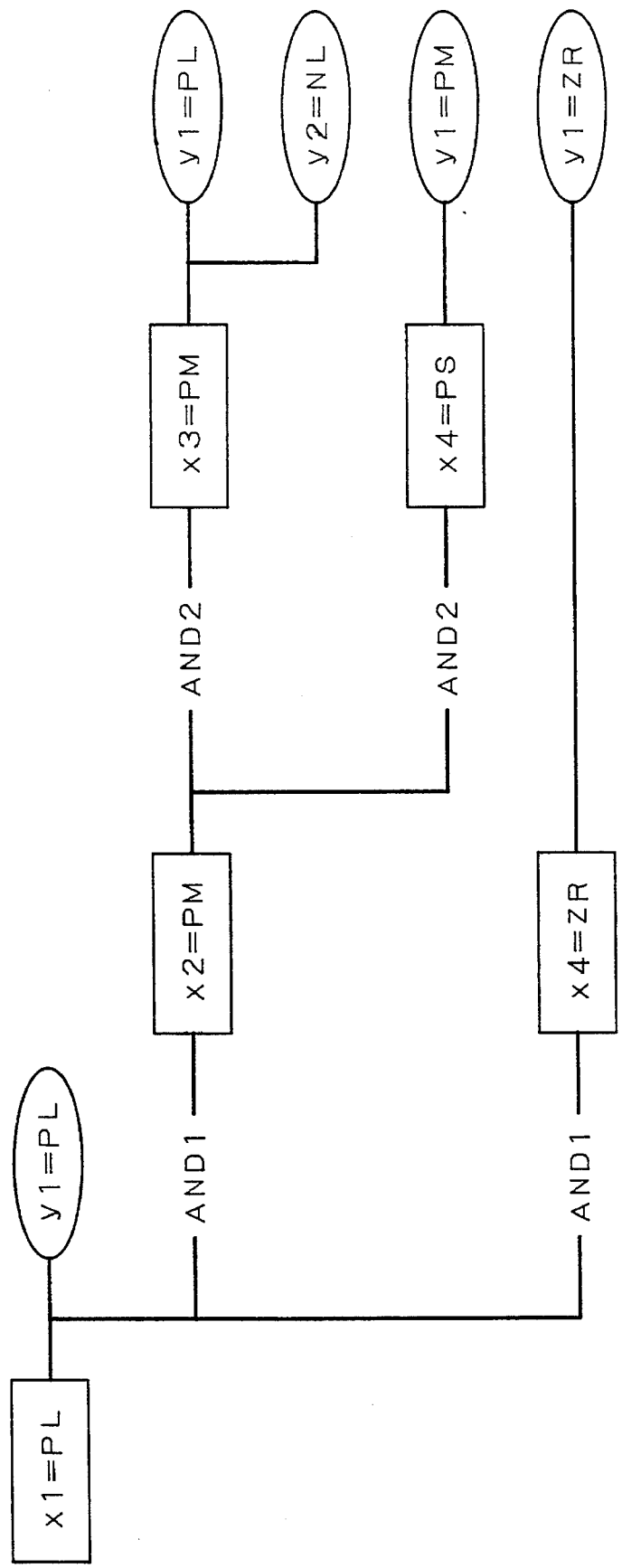
FIG. 12 shows a tree structure diagram for the rules.

For example, the subrules of rules 1, 2, 6, 8 and 9, which belong to the group described above, are organized in the form of the tree structure shown in FIG. 12.

The code IF is attached to the proposition x1=PL, which appears with the highest frequency. The code THEN is attached to the consequent of rule 8, whose antecedent consists only of the proposition x1=PL. The code AND1 is attached to the proposition x2=PM, which is the proposition occurring with the second highest frequency. The code AND2 is added to the propositions occurring with the third highest frequency, which are x3=PM and x4=PS, in rules 1, 6 and 9, which contain both the propositions x1=PL and x2=PM. The code THEN is added to the consequents of these rules. The code AND1 is added to the second most frequent proposition, x4=ZR, in rule 2, which also contains the proposition x1=PL. The code THEN is added to its consequent. These subrules are arranged in the order which the aforesaid reorganized rules are now in, and they are stored in the rule memory.

The work area in rule processing module 2 is divided into the three areas shown in FIGS. 9 (A), (B) and (C): an input data area, an output data area and a consequent data area.

Figure 14:
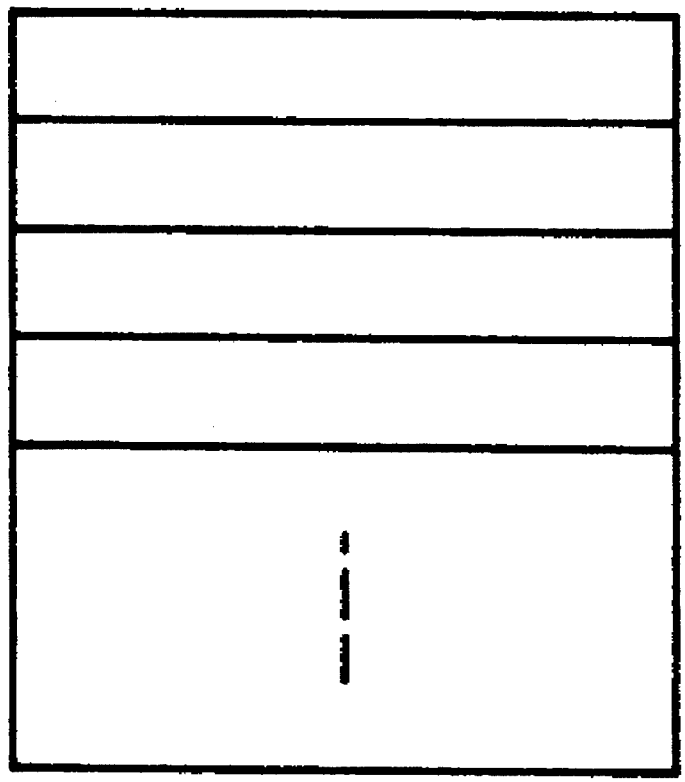
FIG. 14 shows the goodness of fit area of memory.

As can be seen in FIG. 14, the goodness of fit area contains a number of registers, known as R1, R2, R3, . . . , and Ri. (The designations R1, R2, and so on overlap with the designations for rule processing modules; however, the two are not related.)

Figure 15:
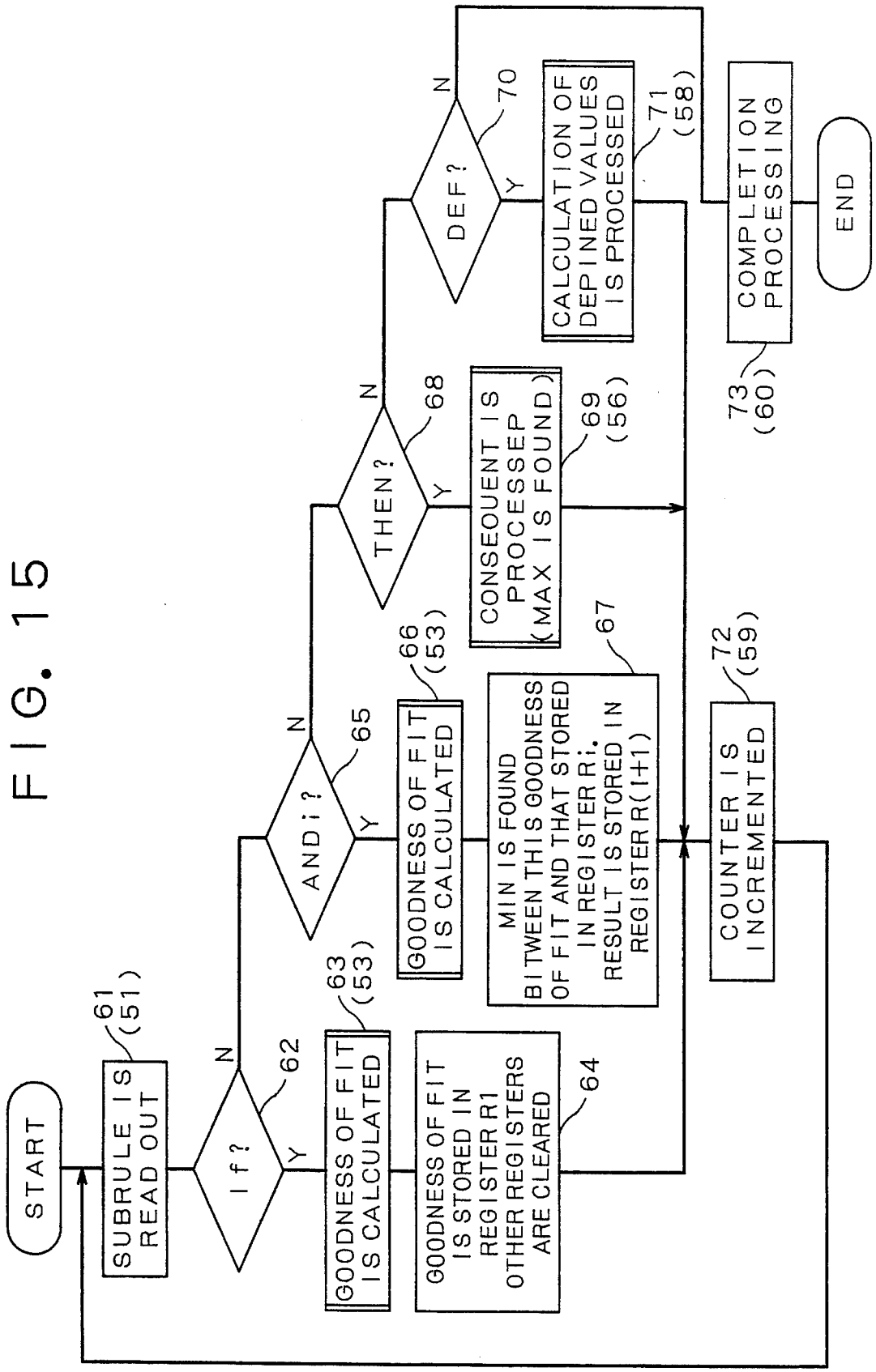
FIG. 15 is a flow chart of the fuzzy inference operations performed in rule processing module R2.

The sequence of processing used by rule processing module 2 for fuzzy inference operations is shown in FIG. 15. In this diagram, some steps in the processing are identical to those shown in FIG. 10. These are labeled with their step numbers from FIG. 10 in parentheses.

First, judgments are made concerning the codes of the subrules read out of the rule memory at Steps 61, 62, 65, 68 and 70). First the code is IF at Step 62 then, the goodness of fit calculated for the subrule is stored in the first register, R1 and the contents of all the other registers is cleared at Step 64.

If the code is determined to be ANDi i=1, 2, . . . at Step 65, a MIN operation is performed between the goodness of fit calculated for that subrule and the goodness of fit stored in register R1. The result of the MIN operation is stored in register R (i+1) (Steps 65 to 68) The number of register R (i+1) is stored in the register number counter.

If the code is determined to be THEN at Step 68, a MAX operation is performed at Step 69 comparing the goodness of fit stored in the register whose number is stored in the register number counter with the value in the designated storage space in the consequent data register. The result of this MAX operation is stored in the appropriate storage space.

If the code is DEF or END, the processing is the same as that performed in Steps 58 and 60 by rule processing module 1. (Steps 71 and 73). Rule processing module 2 was described in patent application Ser. No. 2-139106 by the same applicant, entitled "A Scheme to Optimize Fuzzy Inference Rule Descriptions for Fuzzy Inference." The information in that application are incorporated herein by reference.

(5-3) Rule Processing Module R3.

Figure 18:
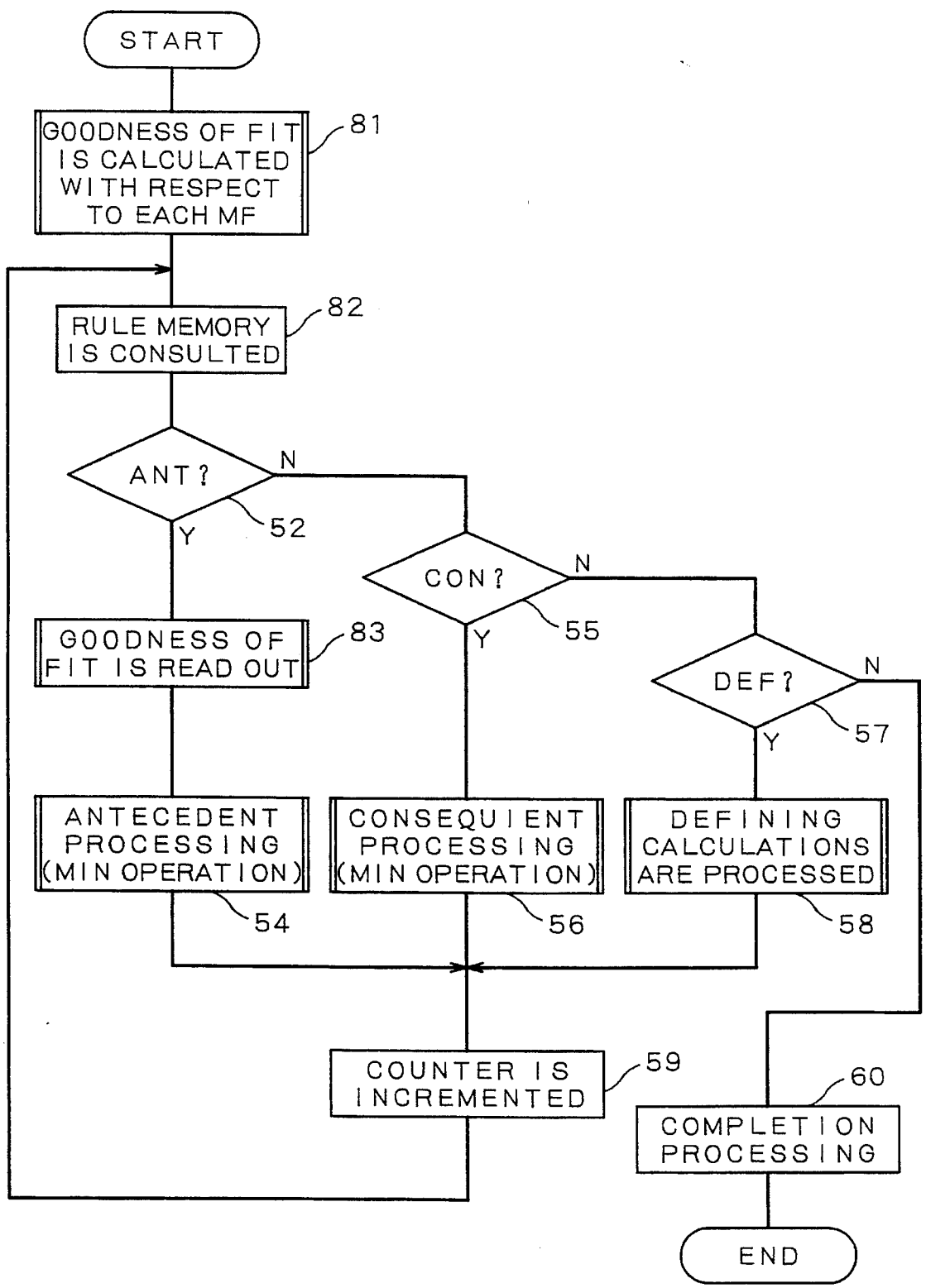
FIG. 18 is a flow chart of the fuzzy inference operations performed in rule processing module R3.

Details of rule processing module R3 are illustrated in FIGS. 16 through 18.

Rule processing module R3 calculates the goodness of fit for every combination of antecedent input variables and membership functions, and stores these data ahead of time in the work area of the memory.

The goodness of fit area created in this way is shown in FIG. 17. The other work areas, i.e., the input data area, the output data area and the consequent data area, are shown in FIGS. 9 (A), (B), (C) and (D). The goodness of fit area shown in FIG. 9 (D) is also used to store the results of MIN operations.

The rules are described using the addresses in the goodness of fit area. The contents of the rule memory are shown in FIG. 16. For example, the first subrule is x1=PL (see FIG. 8). Among the data representing this subrule, the goodness of fit for the subrule x1=PL stored in the goodness of fit area is given the address of ad1 to indicate the location where it is stored. In other respects, the rule memory is identical to that shown in FIG. 8.

As the first step of fuzzy inference processing, the goodness of fit of the input data is calculated with respect to each of the antecedent membership functions, as shown in FIG. 18. (Step 81) The code and address (the rule data) are read out of the rule memory, and a judgment is made as to whether the code is ANT, CON or DEF in a manner similar to that previously described in FIG. 10. (Steps 82, 52, 55 and 57). If the code is ANT, the goodness of fit area is accessed using the address data in the rule data. The goodness of fit stored at this address is read out and a MIN operation is performed.

The rest of the processing is identical to that shown in FIG. 10. Steps which are identical have been labeled with their numbers from FIG. 10.

(5-4) Rule Processing Module R4.

Rule processing module R4 performs the fuzzy inference processing, including calculating goodness of fit, for each input datum in the order in which the data are input. Details of this module are shown in FIGS. 19 through 22.

FIG. 19 shows the contents of the rule memory. The rules are the same as those shown in FIG. 7. The membership functions, however, have the feature that input variables which are not in combinations have the code S attached to them to indicate this fact (for example, the variable x3=S in Rule 1.)

Figure 20:
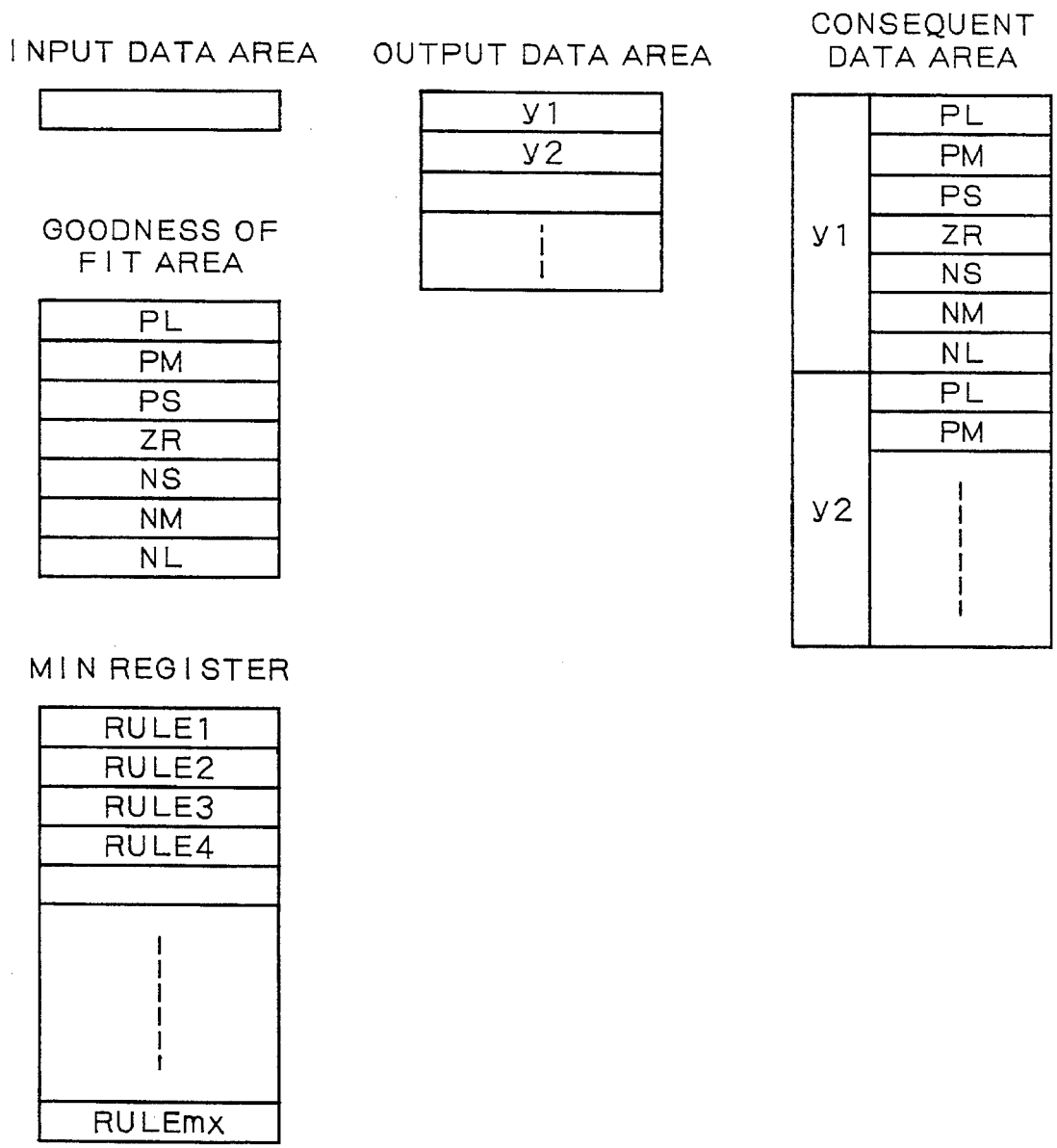
FIG. 20 shows the contents of the work area.

FIG. 20 shows the work area in the RAM. The input data area should theoretically have the capacity (one byte) to store a single set of input data. The output data area and consequent data area are identical to those shown in FIG. 9. The goodness of fit area has the capacity to store the goodness of fit of one input variable with respect to seven membership functions. There is also a MIN register area, which stores the result of the MIN operation performed on the goodness of fit obtained in the consequent processing of each rule. In this example, the number of rules will be mx.

Figure 21:
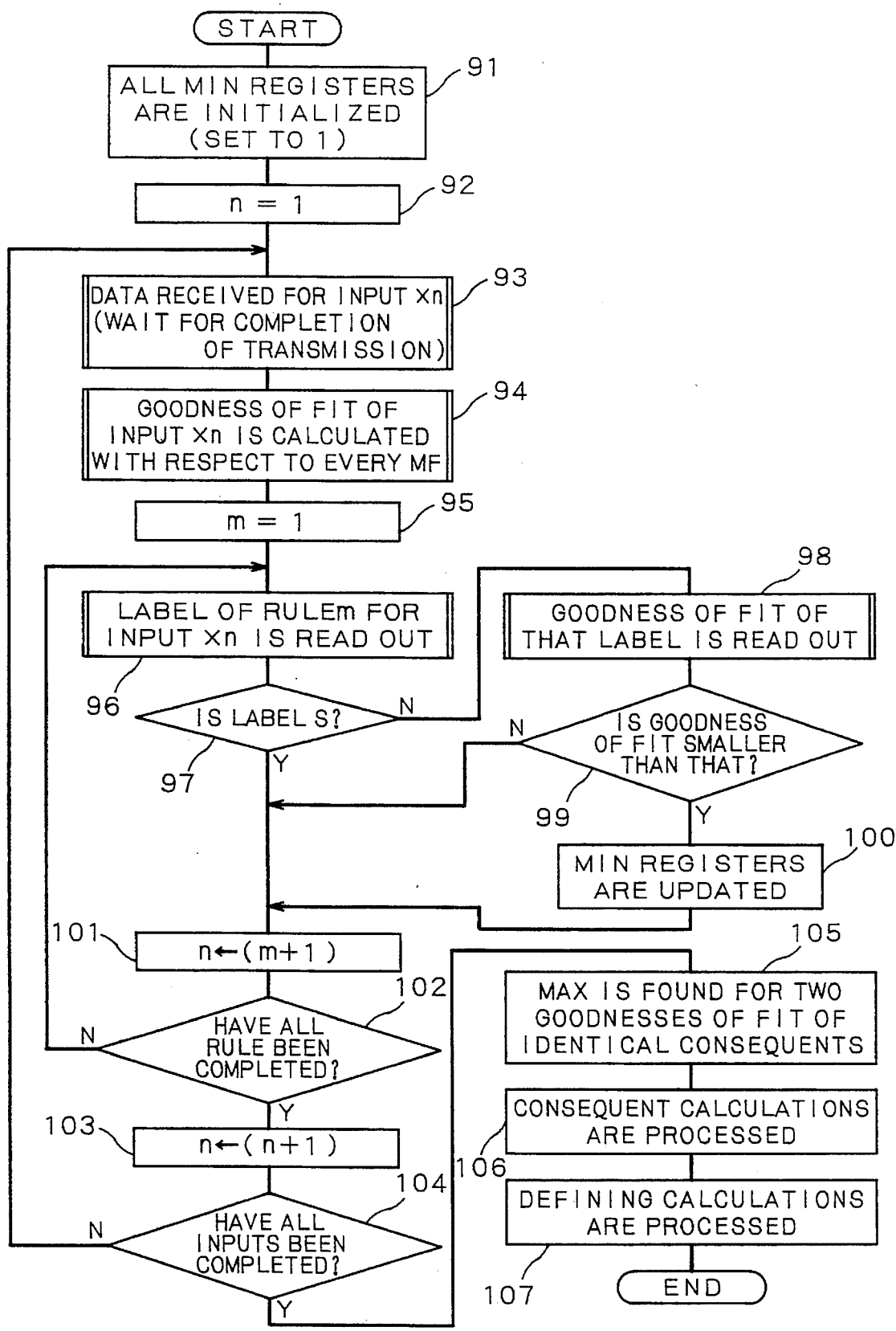
FIG. 21 is a flow chart of the fuzzy inference operations performed in rule processing module R4.

The sequence of fuzzy operation processing will now be explained with reference to FIG. 21.

Let us assume that the input variables x1, x2, x3 and x4 are entered in that order. All the MIN registers are then initialized at Step 91. In this initial processing, the maximum value for goodness of fit, namely 1, is set in all the MIN registers.

The counter value n, which represents the number of the input variable, is then set to 1 at Step 92. The input variables x1, x2, x3 and x4 are given the input variable numbers 1, 2, 3 and 4.

The module waits until input data are received (or input) for the first input variable x1. When it receives these input data, it stores them in the input data area (Step 93).

The goodness of fit of the input data is obtained for the input variable which the module has received, with respect to each of the membership functions PL through NL which have been established. The goodnesses of fit which have been determined are stored in sections of the goodness of fit area corresponding to the membership function labels. (Step 94) The counter value m which represents the rule number is then initialized at Step 95 to 1.

At Steps 96 and 97, the rule memory is consulted, and a check is made to determine whether the label of the membership function attached to the input variable xn in rule m has the code S. If the code for the input variable xn is combined with an S, the antecedent processing of the input variable (which is described below) can be omitted.

If the label of the membership function attached to input variable xn in rule m is something other than S, (i.e., one of the labels from PL to NL), the goodness of fit for that label is read out of the goodness of fit area at Step 98. A judgment is then made at Step 99 (a MIN operation) whether this goodness of fit value is smaller than the goodness of fit value set in the MIN register for rule m. In the case of the first input variable, x1, the MIN register was initialized by being set to its maximum value, 1. Thus, if the goodness of fit which is read out is anything other than 1, the judgment in Step 99 will be a YES. If the answer in Step 99 is YES, the goodness of fit read out of the goodness of fit area is then stored in the MIN register, and the contents of the MIN register are updated (Step 100). In this way, each time an input variable is processed, a MIN operation is performed on the goodness of fit of the rule associated with that input variable, and the minimum value for that goodness of fit for that rule is obtained.

When the counter value m, which represents the rule number, is incremented, the antecedent processing described above in Steps 96 through 100 is repeated for each rule Steps 101 and 102.

Figure 22:
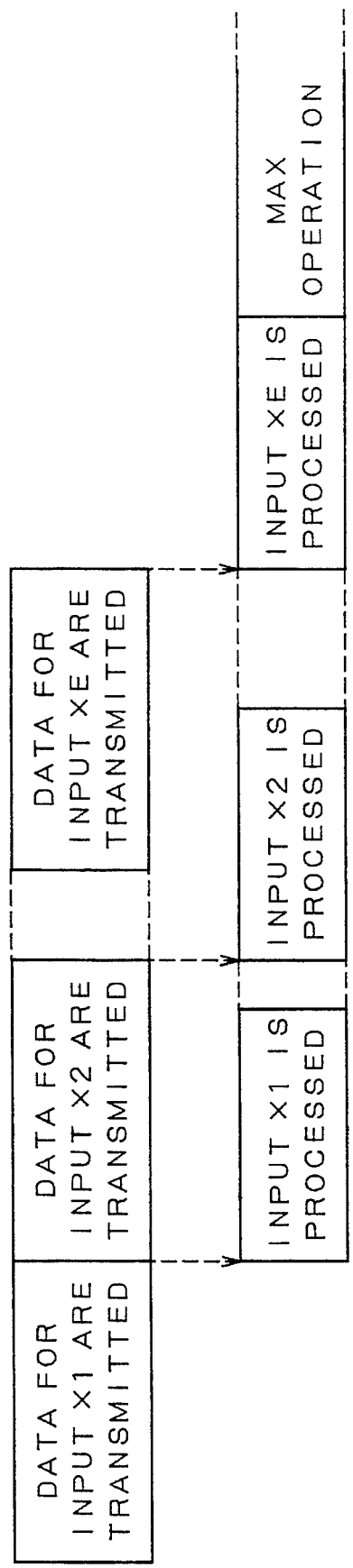
FIG. 22 shows the flow of processing in rule processing module R4.

When the aforementioned counter value m goes to mx + 1, the aforesaid antecedent processing has been completed for all the rules. The counter n, which indicates the number of the input variable, is incremented by 1, and the module is directed to the next input variable (Step 103). Processing then waits until it receives input data for the next variable (Step 104). In this way, the antecedent processing of an input variable is performed each time input data is received. The efficacy of this, as can be seen in FIG. 22, lies in the fact that the antecedent processing of input data can go on for data already received at the same time the next input data are being transmitted. Thus, in cases in which data transmission requires a lengthy period, the waiting time is shortened and the processing efficiency of the system as a whole is improved. In FIG. 22, input data xE represent the final input data. They correspond to the data for input variable x4 in our example.

Referring back to FIG. 21, when the antecedent processing of the final input variable x4 has been completed (Step 104), the module checks to determine whether the consequents have any identical rules. For example, Rules 1 and 6 (shown in FIG. 19) both have the consequent y1=PM, and Rules 2 and 5 both have the consequent y1=ZR. A MAX operation is performed on rules whose consequents are identical for the goodness of fit obtained with each rule. The result of this MAX operation is used for the label of the consequent membership function and stored in the consequent data area. (Step 105) For example, let us call the goodness of fit obtained in the antecedent processing of Rule 1 (which is the result of the aforesaid MIN operation, i.e., the goodness of fit stored in the MIN register) a1, and the goodness of fit of Rule 6, a6. A MAX operation is thus performed comparing goodnesses of fit a1 and a6. The result, which will either be A1=a1 or A1=a6, whichever is greater, will be used for consequent membership function PM. The result is stored in the consequent data area.

Thus when the goodnesses of fit are obtained which are to be used for the consequent membership functions (the results of the aforementioned MAX operation or the goodness of fit for each rule when no two rules have the same consequent), all the goodnesses of fit are stored temporarily in the consequent data area. These goodnesses of fit operate on the corresponding consequent membership functions (MIN operations or truncations), and MAX operations are performed to compare the resulting membership functions with each other. These operations constitute the consequent operation processing (Step 106).

Finally, the results of the consequent operation processing are defuzzified, and defined output data for the output variable are obtained (Step 107). These output data are stored for each output variable in the output data area.

We have applied for a patent for rule processing module 4 under the title "A Scheme and A Device for Fuzzy Processing" (May 5, 1991, File No. 90194), the disclosure of which is incorporated herein by reference.

(6) Details of Membership Function (MF) Processing Modules.

In this section, we shall discuss the three MF processing modules described previously.

(6-1) MF Processing Module M1.

Figure 24A:
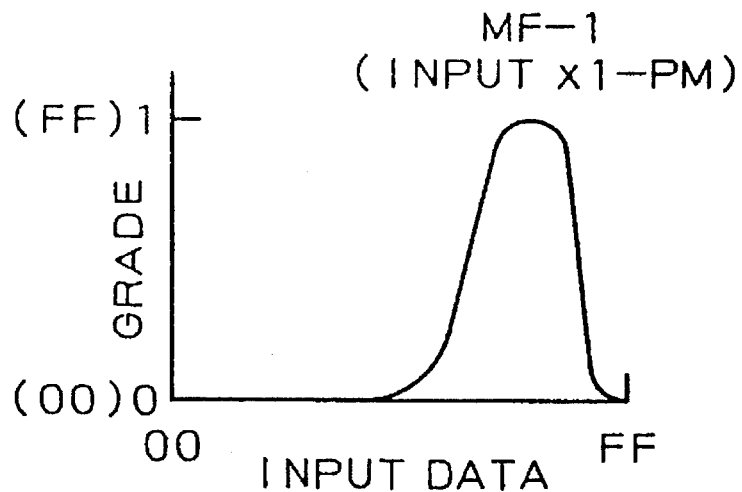
FIGS. 24 (A) and (B) are graphs which illustrate examples of membership functions.
Figure 24B:
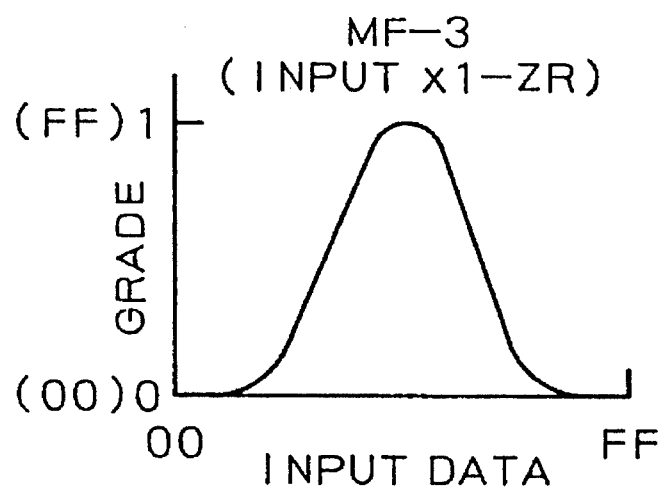

MF processing module 1 is illustrated in FIGS. 23 and 24. In this module, each membership function has a value (or grade). This value is stored in the memory (the ROM) at the address of the variable. The grade might, for example, be expressed as eight bits. The value of the variable is also expressed as eight bits, so each membership function has a value between 00 and FF.

As can be seen in FIG. 23, N+1 membership functions have been set up which are known as MF-0 to MF-N. The value of the variable associated with the membership function is expressed by the address in the lower eight bits. The upper bits, that is, bits 9 and above, indicate the type of membership function (label or number). The pairing of the membership function numbers 0 to N with input variables and labels is repeated to achieve the correspondence of MF-0 and input x1-PL and that of MF-1 and input x1-PM. Examples of membership functions which have been established are shown in FIGS. 24 (A) and (B). The user is free to establish whatever shape of membership function he desires.

The membership function value (the goodness of fit) is read out of the memory by accessing the lower eight bits of the address of the input data, and the membership function number by accessing the upper eight bits.

(6-2) MF Processing Module M2.

Figure 25:
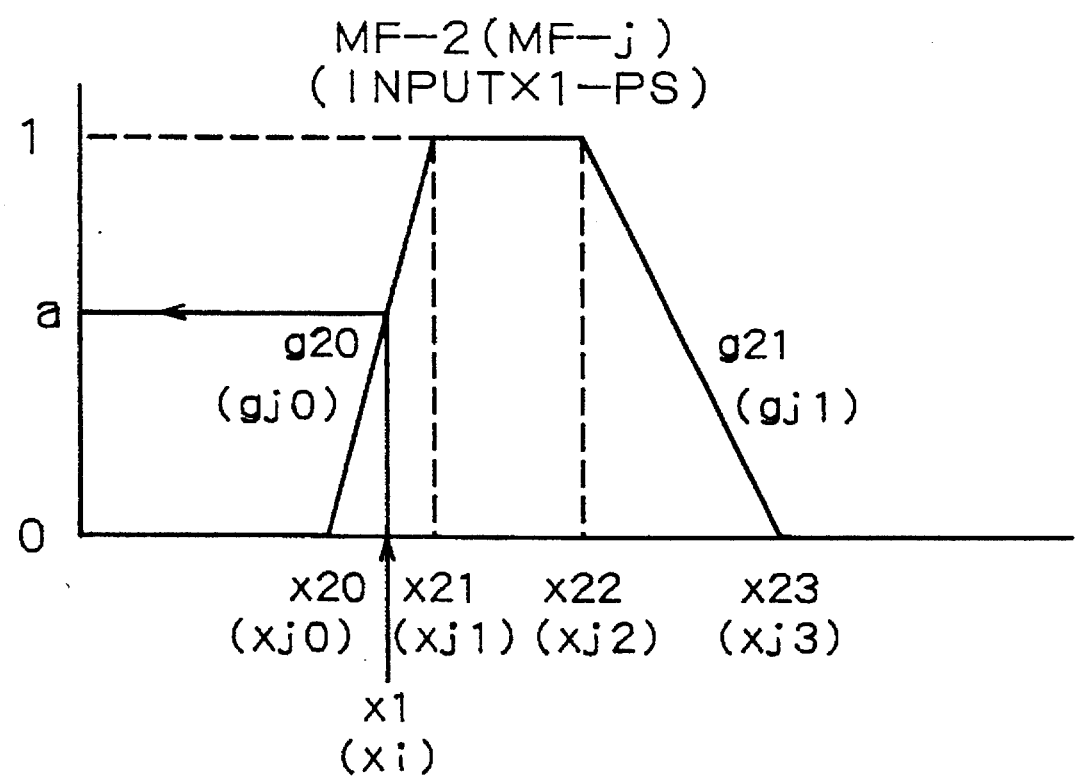
FIG. 25 is a graph of a membership function in a processing module M2.
Figure 26A:
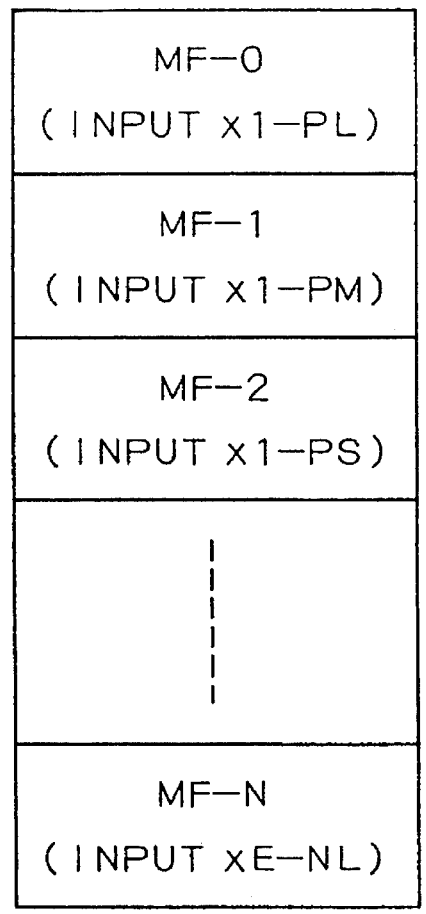
FIGS. 26 (A) and (B) show the contents of the MF memory.
Figure 26B:
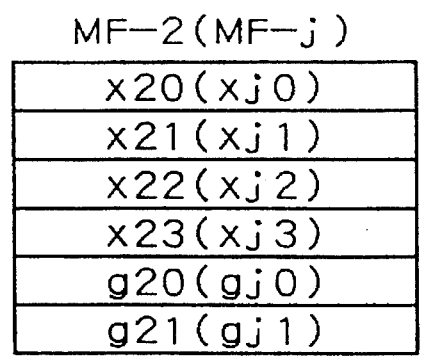
Figure 27:
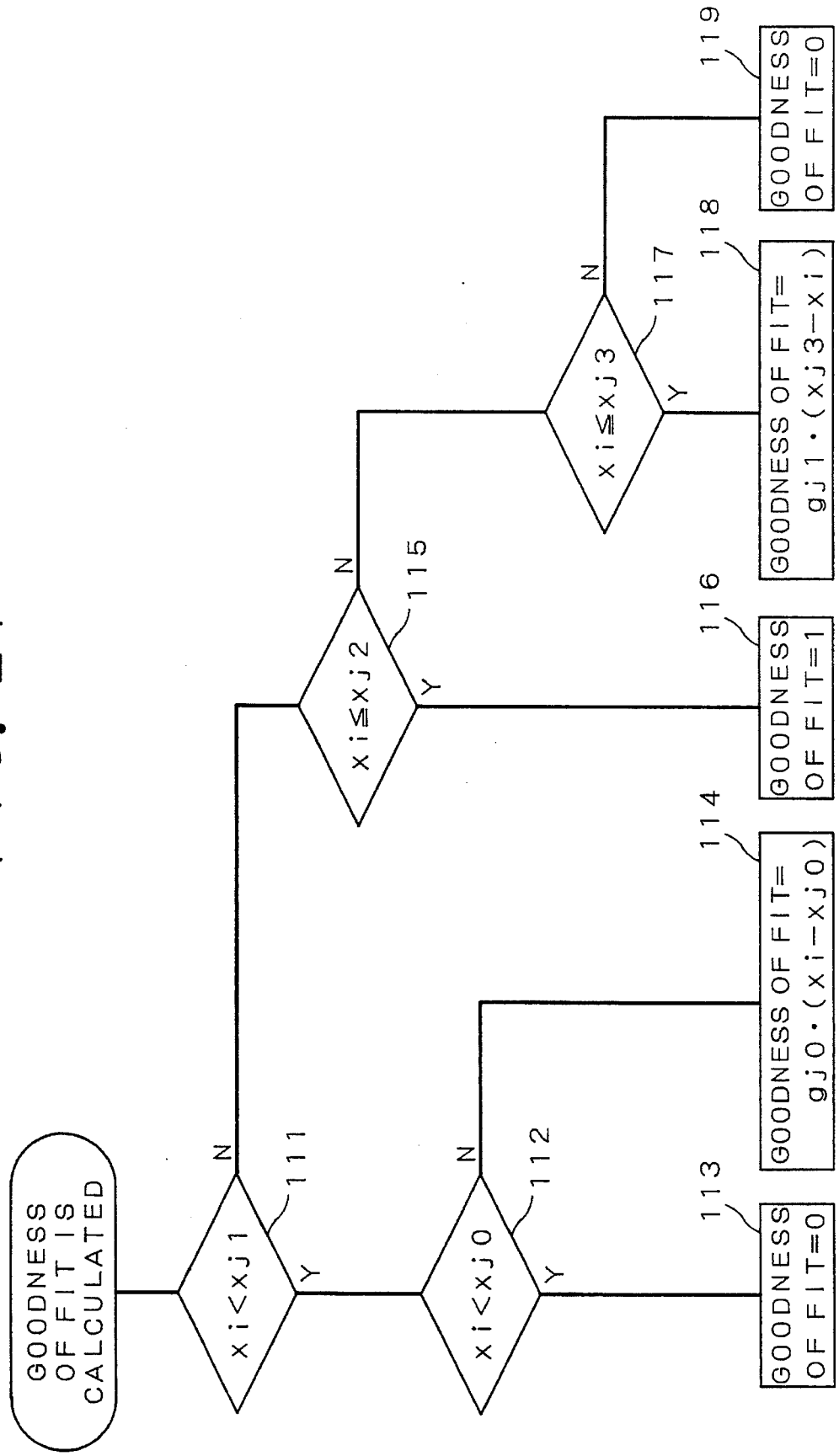
FIG. 27 is a flow chart of the goodness of fit operations performed in processing module M2.

MF processing module 2 is pictured in FIGS. 25 through 27.

As shown in FIG. 25, the basic shape of a membership function is a trapezoid. This membership function is specified by giving the coordinates of its four corners and its left and right slopes. The corner points further from the center have a grade of 0, and those nearer the center a grade of 1. Thus, these points can be specified by giving them the input variable (horizontal axis) coordinates of $xj0$, $xj1$, $xj2$ and $xj3$. The left and right slopes are given by $gj0$ and $gj1$. Here j is the number of the membership function. If $xj1=xj2$, then the membership function is a triangle.

FIG. 26 (A) shows the memory (for example, a ROM) as a whole; FIG. 26 (B) shows the area designated for a single membership function. Compared to the MF processing module 1, which was described above, module 2 has a somewhat smaller memory area.

FIG. 27 is a flowchart showing the sequence of processing used to calculate the goodness of fit of input data with respect to the membership functions discussed above. The input data are expressed as xi.

As shown in Steps 112, 113, 117 and 119, processing tests whether $xi<xj0$ and $xi>xj3$. If so, then the goodness of fit is set equal to 0.

In the region where $xji<xi<xj2$, the goodness of fit will be 1. (Steps 111, 115 and 116. In the region where $xj0 \leq xi<xj1$, the goodness of fit is calculated using the slope $gj0$ $(xi-xj0)$ (Steps 111, 112 and 114).

In the region where $xj2<xi>xj3$, the goodness of fit is obtained using the slope $gj1$ $(xj3-xi)$ (Steps 115, 117 and 118).

(6-3) MF Processing Module M3.

Figure 28:
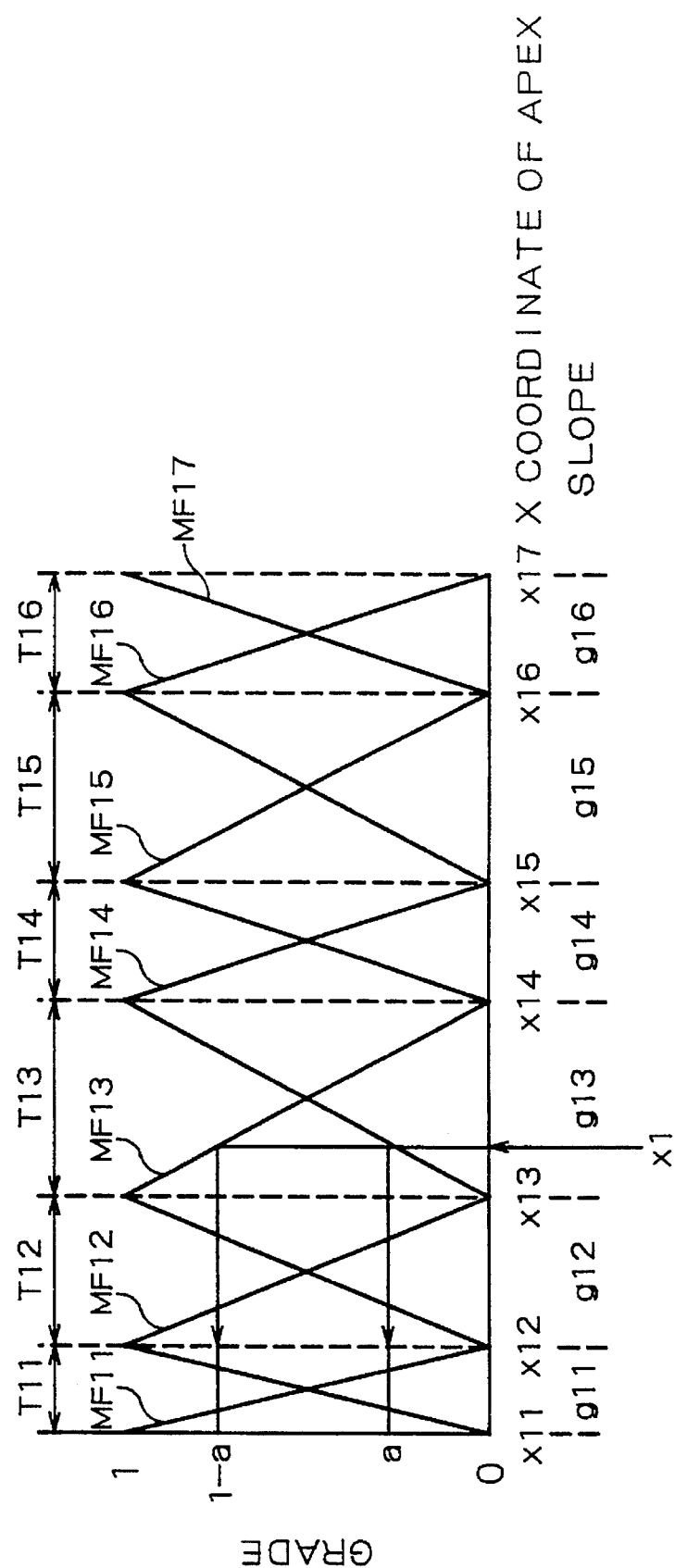
FIG. 28 is a graph which shows membership functions in a processing module M3.
Figure 30:
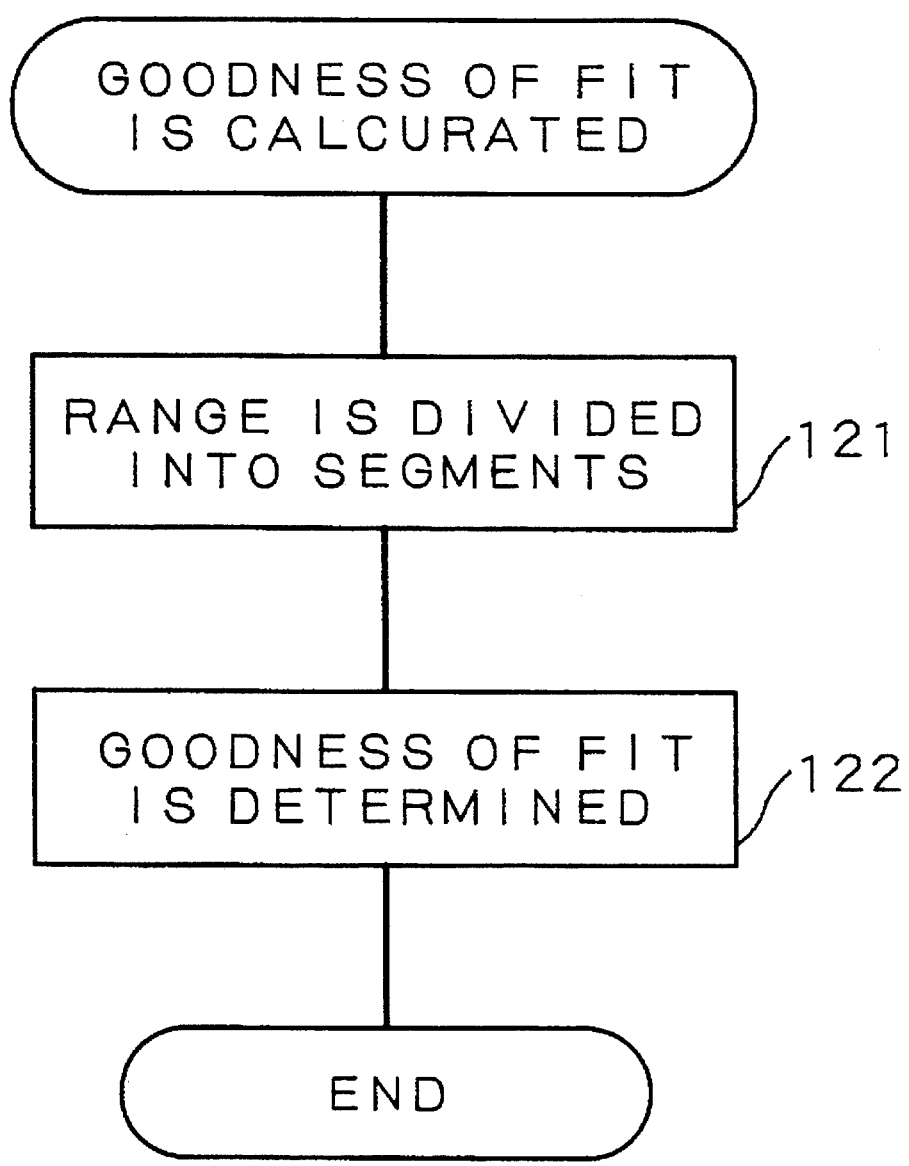
FIG. 30 is a flow chart of the goodness of fit operations performed in processing module M3.

Details of MF processing module M3 are shown in FIGS. 28 through 30.

In MF processing module 3, the basic shape of the membership function is a triangle. A triangle can be defined by giving the coordinates of the apex and the slopes of the oblique sides, or by giving the coordinates of the apex and of the endpoints of the base. If we always assign the apex a grade (the value of the membership function) of 1, then we need only the variable x to give the coordinates of the apex. The extent in which the grade of a triangular membership function is not 0 (i.e., the extent along the length of the base) is called the domain of the membership function.

In this example, the membership function is defined by the coordinates of the apex and the slopes of the oblique sides. We shall now discuss the creation of seven membership functions for the input variable x1. As shown in FIG. 28, the seven membership functions for the input variable x1 are called MF11 through MF17. The apices of these membership functions have the x coordinates x11 through x17. The grade of all the apices is 1.

In this example, the domain of each membership function is determined by the extent between the x coordinates of the apices of the contiguous membership functions to the left and right. The leftmost and rightmost membership functions have a domain between the x coordinates of the apex of the contiguous membership function to the right or left and left or right endpoint of the extent of the variable x.

The extent of the variable x can be divided at the coordinates of the apices x12 through x16 into six segments, T11 through T16. In each segment, the contiguous membership functions to the right and left are defined as overlapping. Further, the contiguous membership functions are symmetrical left and right with respect to the center of the segment. Thus, only one of the slopes g11 through g16 needs to be specified in each segment. In this example, positive slopes are specified. In each segment, the slope of the left side of the membership function to the right will be one of g11 through g16. The slope of the right side of the membership function to the left will be one of -g11 through -g16.

The slopes g11 through g16 in segments T11 through T16 are calculated using the apex coordinate data x11 through x17. Slope g1i is obtained by solving g1i=1/[x1 (i+1) x1i]. The 1 in the numerator represents the grade. If this were to be expressed in 8-bit notation, the above formula would have 256 instead of 1 as the numerator.

The data which define seven membership functions for the input variable x1 are all arranged as described above. These membership function data are shown in FIG. 29. As can be seen in the diagram, far fewer data are needed to express a single membership function than in MF processing module 2, described above, which must specify the coordinates of the apex, the slopes of the two oblique sides, and if necessary, the coordinates of the endpoints of the base.

The processing described above is repeated for each input variable.

We shall next discuss the processing involved in the calculation of goodness of fit, with reference to FIG. 30.

At Step 121, a judgment is made as to which segment the input data belong in. For example, if the input data x1 in FIG. 29 is used (input data are also expressed as x1) these input data x1 are smaller than x14, and they are also smaller than x13, so the judgment is made that they belong in segment T13. Thus, the segment, which was judged appropriate, is stored in the buffer designated for input variable x1.

Next, the slope data g13 established for the segment which was selected, T13, is used to obtain the goodness of fit a with respect to the membership function on the right, MF14. This goodness of fit is calculated by the formula a=(x1-x13). The goodness of fit with respect to the membership function on the left is calculated as 1-a. (See FIG. 28) If 8-bit notation is used, this becomes 256-a (Step 122) In this way, the goodness of fit of input data x1 calculated with respect to membership functions MF14 and MF13 is stored in the buffer.

We have applied for a patent for MF processing module M3 under the title "A Scheme and Device for Arranging Membership Function Data and A Scheme and Device for Calculating Goodness of Fit" (Application dated May 10, 1991; File No. 90193), the disclosure of which is incorporated herein by reference.

Further processing is required to rearrange and relist the data which represent the rule and membership functions in a way appropriate for the rule and MF processing modules. This, of course, is performed by the compilers described above.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A fuzzy inference development system, comprising:

a specifications input device for receiving inference engine specifications data;

a knowledge input device for receiving knowledge data used in performing at least one fuzzy inference;

an inference engine memory for storing a plurality of inference engines; and a selection processor for selecting at least one of said plurality of inference engines from said inference engine memory based upon a determination by said selection processor that said selected inference engine is appropriate for said at least one fuzzy inference which uses said knowledge data received from said knowledge input device and said inference engine specifications data received from said specifications input device.

2. A fuzzy inference development system of claim 1, further comprising:

an inference engine processor for modifying said selected at least one inference engine to increase efficiency of said inference engine for processing said knowledge data; and a knowledge data processor which modifies said received knowledge data in order to increase said knowledge data compatibility with said selected inference engine module.

3. The fuzzy inference development system of claim 1, wherein said selection processor performs fuzzy inference calculations according to received specified rules using characteristic parameters of said specifications data and said received knowledge data in order that said selection of said at least one said inference engine by said selection processor occurs according to results of said calculations.

4. The fuzzy inference development system of claim 1, wherein said specifications input data comprise at least one of the following fields:

a capacity of a work area field in a fuzzy inference operations memory;

a capacity of an inference engine memory field;

a computing speed field required by each of said plurality of inference engine modules;

a sequence of processing data field to be used for anticipated input data in a fuzzy inference; and a number of degrees of freedom associated with a shape of a membership function field established in an antecedent of a fuzzy inference rule.

5. The fuzzy inference development system of claim 4, wherein said specifications data further comprises a data field concerning a type of CPU to be used by said development system user and an operating clock frequency.

6. The fuzzy inference development system of claim 4, wherein said specifications data further comprise a data field concerning priority ranking between said capacity of a work area field, said capacity of an inference engine memory field, said computing speed field, said sequence of processing data field, and said number of degrees of freedom field.

7. The fuzzy inference development system of claim 1, wherein each of said plurality of inference engines, comprises:

a rule processing module which stipulates how specified rules are to be processed; and a membership function processing module which includes:

a description module for defining designated membership functions; and a goodness of fit calculating module for calculating a goodness of fit input data for a plurality of membership functions.

8. The fuzzy inference development system of claim 7, wherein said rule processing module and said membership function processing module for said plurality of inference engines are stored in said inference engine memory.

9. The fuzzy inference development system of claim 8, wherein said rule processing module, comprises:
   a rule memory;
   rule data ordering means for storing in said rule memory, in the order of entry, rule data which have been input such that fuzzy inference operations are performed in the order of said rule data stored in said rule memory.

10. The fuzzy inference development system of claim 8, wherein said rule processing module further comprises:
   extracting means for extracting common subrules from descriptions of said inputted rule data;
   substituting means for substituting subrules in sequences which are described as having a large number of cycles; and
   inference ordering means for performing fuzzy inferences in an order corresponding to an order of said subrules stored in said rule memory.

11. The fuzzy inference development system of claim 8, wherein said rule processing module further comprises goodness of fit means which calculates and stores a goodness of fit of input data with respect to every antecedent membership function which has been created and which refers to an appropriate goodness of fit stored in said inference engine memory during the processing of each said specified rule.

12. The fuzzy inference development system of claim 8, wherein said rule processing module processes a rule associated with each set of said input data in an order in which said input data is received.

13. The fuzzy inference development system of claim 8, wherein said membership function processing module further comprises:
   a membership function memory for storing a membership function value of each said membership function;
   reading means for reading out from said membership function memory values of said input data; and
   calculating means for calculating and outputting a goodness of fit of said input data.

14. The fuzzy inference development system of claim 8, wherein said membership function processing module comprises:
   storing means for storing membership function data which expresses said membership function and whose basic form is a trapezoid in order to define each membership function by coordinates of points where angles are located and where there is a slope of ascent and descent; and
   a computer for calculating and outputting a goodness of fit of said input data.

15. The fuzzy inference development system of claim 8, wherein said membership function processing module comprises:
   triangular membership function establishing means for establishing a single input variable such that every two adjacent membership functions overlap, and the areas of overlap are symmetrical;
   coordinate storing means for storing in a membership function memory coordinates of the apex of each said membership function and the slope of one of its sides; and
   fit determining means for determining a goodness of fit of said input data by a value of said apex coordinates and said slope.

16. The fuzzy inference development system of claim 1, further comprising simulation means for simulating fuzzy inferences in accordance with said received knowledge data.

17. The fuzzy inference development system of claim 1, further comprising:
   a data base for storing properties for each of said plurality of inference engines stored in said inference engine memory along with property data for calculating each said properties; and
   property determining means for calculating properties of inference engines by selectively applying said property data stored in said data base to characteristic parameters of said selected at least one inference engine and characteristic parameters of said received knowledge data.

18. The fuzzy inference development system of claim 17, wherein said properties of said inference engines are stored in at least one work area of a fuzzy inference execution memory, said work area having memory capacity sufficient to store said selected fuzzy inference engine module and sufficient for a computing speed of a designated processor.

19. The fuzzy inference development system of claim 17, further comprising display means for displaying said properties of inference engines calculated by said property determining means.

20. The fuzzy inference development system of claim 19, wherein said display means displays properties of said selected at least one inference engine.

21. The fuzzy inference development system of claim 20, further comprising inference engine input means, for receiving acceptance of one of said at least one selected inference engine whose properties are displayed on said display means.

22. The fuzzy inference development system of claim 21, further comprising an acceptance input means which receives said acceptance or a rejection of one of said selected inference engines whose properties are displayed on said display means.

23. The fuzzy inference development system of claim 22, further comprising a control device which allows a user to reenter specification data through said specifications input device or reenter knowledge data through said knowledge input device when such user has provided, through said acceptance input means, a rejection of one of said selected inference engines.

24. A fuzzy inference development method, comprising the steps of:
   prestoring a variety of inference engines in an inference engine library;
   inputting specifications data concerning requirements for desired inference engine;
   inputting knowledge data necessary for performing at least one fuzzy inference; and
   selecting at least one inference engine from said variety of prestored inference engines which most closely fit said at least one fuzzy inference defined by said knowledge data and most closely matches said specifications data.

25. The method of claim 24, further comprising the steps of:
   processing said selected at least one inference engine so as to render said engine more suitable for efficiently processing said inputted knowledge data; and
   modifying said inputted knowledge so as to render said knowledge more suitable for said selected inference engine.

26. The method of claim 24, wherein said selecting step further comprises the step of performing fuzzy inference operations according to specified rules, using characteristic parameters of said inputted specifications data and provided knowledge data, in order that said selection step occurs so as to select an appropriate inference engine according to the results of said fuzzy inference operations.

27. The method of claim 24, wherein said inputted specifications data comprises:

a capacity of the work area field in a fuzzy inference operations memory;

a fuzzy engine memory capacity field;

a computing speed field required by said fuzzy engines;

a sequence of processing data field to be used for anticipated input data in a fuzzy inference; and a number of degrees of freedom associated with a shape of the membership function field established in an antecedent of a rule.

28. The method of claim 27, wherein said inputted specifications data further comprises a CPU type data field defining what type of CPU is expected to be used and what its operating clock frequency will be.

29. The method of claim 27, wherein said specifications data further comprises a data field concerning importance and priority ranking relating to said capacity of said work area field, said fuzzy engine memory capacity field, said computing speed field, said sequence of processing field, and said number of degrees of freedom field.

30. The method of claim 24, wherein each of said inference engine modules comprises a rule processing module which stipulates how specified rules are to be processed and a membership function processing module which stipulates a designated membership function as well as how to calculate a goodness of fit of input data with respect to said designated membership function.

31. The method of claim 24, further comprising the steps of:

stipulating how specified rules are to be processed; and storing membership function processing modules, wherein each inference engine is a combination of a rule processing module and a membership function module.

32. The method of claim 24, further comprising the steps of:

executing a simulation of fuzzy inference in accordance with said knowledge data; and judging validity of said knowledge data according to the result of said executed simulation.

33. The method of claim 32, further comprising the step of:

revising said knowledge data after said executed simulation by executing another simulation.

34. The method of claim 24, wherein said selected at least one inference engine calculates properties of inference engines by applying an operational scheme, which is stored in a data base for properties of inference engines to characteristic parameters of an inference engine and said knowledge data.

35. The method of claim 34, wherein said inference engine selecting step is based upon at least one of the following properties: a work area in the memory which is needed to execute fuzzy inferences; a memory capacity needed to store a fuzzy inference engine; and a computing speed for fuzzy inferences.

36. The method of claim 34, further comprising the step of displaying said properties which have been calculated.

37. The method of claim 36, wherein said selection step further comprises:

first selecting several inference engines;

determining properties of said first selected inference engines; and displaying said determined properties for each of said first selected inference engines.

38. The method of claim 37, further comprising the step of:

second selecting one of said first selected inference engines whose properties are displayed.

39. The method of claim 37, further comprising the step of accepting/rejecting said second selected inference engine.

40. The method of claim 39, further comprising the step of re-entering said inputted specifications data or provided knowledge data when said second selected inference engine has been rejected.

41. A development support system for a fuzzy inference device, comprising:

specifications input means for inputting data concerning specifications which a user requires for an inference engine;

knowledge input means for inputting data associated with knowledge needed to perform fuzzy inferences;

data preparation means for preparing data according to rules which contain, in their respective antecedents, propositions concerning characteristics parameters of said inputted specifications and knowledge data and which contain in their consequents propositions concerning various inference engines; and determining means for performing operations that determine which of said various inference engines is best suited for said fuzzy inferences to be performed in light of said inputted knowledge data and specifications data.

42. The development support system for a fuzzy inference device of claim 41, wherein said specifications data comprise at least a capacity of a work area field in a memory which can be used for fuzzy inference operations, a memory capacity field which are used for storage of inference engines, a computing speed field required by the inference engines, a sequence of processing field to be used for the anticipated input data in a fuzzy inference, and a number of degrees of freedom field associated with a shape of membership functions established in the antecedent of each said rule.

43. The development support system for a fuzzy inference device of claim 41, wherein said knowledge data comprises at least one of the following values:

a number of rules;

a number of types of input variables;

a number of types of output variables; and a number of ways that input variables in an antecedent can be combined with membership functions.

44. The development support system for a fuzzy inference device of claim 41, wherein each of said various inference engines comprises:

a rule processing module which includes a scheme for processing various rules which have been set up;

a membership function processing module which contains a scheme to describe the membership functions which have been created as well as a scheme to calculate a goodness of fit of input data with respect to membership functions wherein consequents of said rules contain propositions concerning said rule processing module and said membership function processing module.

45. A method for developing fuzzy inferences, comprising the steps of:

inputting data concerning at least one of the specifications required for an inference engine;

inputting knowledge data needed for said fuzzy inferences that are intended to be performed;

preparing data which concern at least one characteristic parameter of said provided knowledge data;

performing inference operations using said inputted data concerning said specifications and said prepared data concerning at least one characteristic parameter according to rules, said rules containing in their antecedents, propositions concerning said characteristic parameters of said specifications and knowledge data, and said rules containing in their consequents, propositions concerning various inference engines; and determining, after said inference operations, which of said various inference engines is best suited for the fuzzy inferences to be performed in light of said provided knowledge data and which best meets said inputted specifications.

46. The method of claim 45, wherein said specifications data comprises a capacity of a work area field in a memory which can be used for fuzzy inference operations, a memory capacity field which are used for storage of inference engines, a computing speed field required by said inference engines, a sequence of processing field to be used for anticipated input data in a fuzzy inference, and a number of degrees of freedom field associated with a shape of a membership function established in the antecedent of a rule.

47. The method of claim 45, wherein said provided knowledge comprises at least one of the following:

a number of rules;

a number of types of input variables;

a number of types of output variables, and a number of ways that said input variables in said antecedent can be combined with membership functions.

48. The method of claim 45, wherein each of said various inference engines module consists of a rule processing module and a membership function processing module and said rule processing module has a scheme for processing various rules which have been setup, and the membership functions which have been created as well as a scheme to calculate the goodness of fit of the input data with respect to the membership functions wherein consequents of said rules contain propositions concerning the rule processing modules and the membership function processing modules.

* * * * *